United States Patent
Yang et al.

(10) Patent No.: US 11,589,278 B2
(45) Date of Patent: Feb. 21, 2023

(54) BEAM SWITCHING METHOD, MOBILE TERMINAL AND COMPUTER READABLE STORAGE MEDIUM

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 140 days.

(21) Appl. No.: 16/637,716

(22) PCT Filed: Aug. 9, 2018

(86) PCT No.: PCT/CN2018/099574
§ 371 (c)(1),
(2) Date: Feb. 7, 2020

(87) PCT Pub. No.: WO2019/029609
PCT Pub. Date: Feb. 14, 2019

(65) Prior Publication Data
US 2020/0178134 A1 Jun. 4, 2020

(30) Foreign Application Priority Data
Aug. 10, 2017 (CN) .......................... 201710682604.2

(51) Int. Cl.
*H04W 36/06* (2009.01)
*H04W 36/30* (2009.01)
(Continued)

(52) U.S. Cl.
CPC ..... *H04W 36/06* (2013.01); *H04W 36/00837* (2018.08); *H04W 36/305* (2018.08); *H04W 36/36* (2013.01)

(58) Field of Classification Search
CPC ........... H04W 36/06; H04W 36/00837; H04W 36/305; H04W 36/36
(Continued)

(56) References Cited

U.S. PATENT DOCUMENTS

2013/0102345 A1* 4/2013 Jung ..................... H04W 48/20
455/513
2013/0307727 A1 11/2013 He et al.
(Continued)

FOREIGN PATENT DOCUMENTS

CN 102215055 A 10/2011
CN 104321984 A 1/2015
(Continued)

OTHER PUBLICATIONS

European Search Report in Application No. 18843265.2 dated Jun. 2, 2020.
(Continued)

*Primary Examiner* — Faisal Choudhury
(74) *Attorney, Agent, or Firm* — Maschoff Brennan

(57) ABSTRACT

A beam switching method, a mobile terminal and a computer-readable storage medium are provided. The method includes: monitoring whether a first blockage event occurs to an antenna of a terminal; and transmitting a beam switching request to a network-side device, in a case that the first blockage event occurs. The first blockage event comprises that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

18 Claims, 6 Drawing Sheets

(51) Int. Cl.
*H04W 36/00* (2009.01)
*H04W 36/36* (2009.01)

(58) Field of Classification Search
USPC .......................................................... 370/331
See application file for complete search history.

(56) References Cited

U.S. PATENT DOCUMENTS

| | | | |
|---|---|---|---|
| 2014/0321294 A1 | 10/2014 | Nagel et al. | |
| 2015/0011159 A1 | 1/2015 | Marinov et al. | |
| 2016/0308277 A1 | 10/2016 | Leiba et al. | |
| 2016/0353510 A1* | 12/2016 | Zhang | H04W 72/085 |
| 2017/0006593 A1 | 1/2017 | Liu | |
| 2018/0042000 A1 | 2/2018 | Zhang et al. | |
| 2018/0083680 A1* | 3/2018 | Guo | H04B 7/0626 |
| 2018/0375556 A1* | 12/2018 | Wang | H04W 16/28 |
| 2019/0261344 A1* | 8/2019 | Grant | H04B 7/0617 |
| 2020/0059398 A1* | 2/2020 | Pan | H04W 72/0413 |
| 2020/0099437 A1* | 3/2020 | Harada | H04W 76/19 |

FOREIGN PATENT DOCUMENTS

| | | |
|---|---|---|
| CN | 106129641 A | 11/2016 |
| CN | 106374984 A | 2/2017 |
| CN | 106453963 A | 2/2017 |
| CN | 106879010 A | 6/2017 |
| WO | 2016/165128 A1 | 10/2016 |

OTHER PUBLICATIONS

CN Office Action in Application No. 201710682604.2 dated Mar. 17, 2020.
CN Search Report in Application No. 201710682604.2 dated Apr. 24, 2019.
"Discussion on UE triggered beam reporting for beam recovery", 3GPP TSG RAN WG1 NR Ad-Hoc Meeting, Jan. 16, 2017.
"On Beam State Reporting" 3GOO TSG-RAN WG1 #88, Feb. 13, 2017.
"Discussion on beam recovery" 3GPP TSG RAN WG1 Meeting #88bis, Apr. 3, 2017.
"Way Forward on Beam Reporting for NR MIMO", 3GPP TSG RAN WG1 Meeting #88, Feb. 13, 2017.
Written Opinion and International Search Report in Application No. PCT/CN2018/099574 dated Feb. 27, 2020.
VIVO. "Discussion on Beam Recovery" 3GPP TSG RAN WG1 Meeting #88bis R1-1704489, Apr. 7, 2017.
Intel Corporation. "On Beam State Reporting" 3GPP TSG-RAN WG1 #88 R1-1702197, Feb. 17, 2017.

* cited by examiner

BEAM SWITCHING METHOD, MOBILE TERMINAL AND COMPUTER READABLE STORAGE MEDIUM

CROSS-REFERENCE TO RELATED APPLICATION

This application is the U.S. national phase of PCT Application No. PCT/CN2018/099574 filed on Aug. 9, 2018, which claims a priority to Chinese Patent Application No. 201710682604.2 filed on Aug. 10, 2017, which are incorporated in their entireties by reference herein.

TECHNICAL FIELD

The present disclosure relates to the field of communication technologies, and in particular to a beam switching method, a mobile terminal and a computer-readable storage medium.

BACKGROUND

Regarding Multiple Antennas

Wireless access technical standards such as Long Term Evolution (LTE) and LTE-Advanced (LTE-A) are established based on multiple-input multiple-output (MIMO) technology and orthogonal frequency division multiplexing (OFDM) technology. The MIMO technology utilizes a degree of spatial freedom that can be obtained by a multi-antenna system to improve a peak rate and a system spectrum utilization.

During the development of standardization, a dimension of the MIMO technology is continually expanding. In LTE Release-8 (Rel-8), up to four layers of MIMO transmission can be supported. In Rel-9, Multi-User MIMO (MU-MIMO) technology is enhanced, and up to four downlink data layers can be supported in MU-MIMO transmission in transmission mode 8 (TM-8). In Rel-10, transmission capacity of Single-User MIMO (SU-MIMO) is extended to a maximum of eight data layers.

The industry is further advancing the MIMO technology in directions of three-dimensional and large scale. It is foreseeable that in a $5^{th}$ Generation (5G) mobile communication system, MIMO technology with a larger scale and more antenna ports may be introduced.

A large-scale antenna array is used in Massive MIMO technology, which can greatly improve the utilization efficiency of a system band and support a larger number of access users. Therefore, the Massive MIMO technology is deemed as one of the most promising physical layer technologies in the next generation mobile communication system by major research organizations.

If an all-digital array is used in Massive MIMO technology, the maximum spatial resolution and the optimal MU-MIMO performance can be achieved. However, this structure requires a large number of analog-to-digital (AD/DA) conversion devices and a large number of complete radio frequency (RF) and baseband processing channels, which causes a huge burden both in terms of equipment cost and baseband processing complexity.

In order to avoid the above implementation cost and equipment complexity, digital-analog hybrid beamforming technology came into being, which is to add a first-level beamforming to an RF signal near the front end of an antenna system based on conventional digital domain beamforming. Analog beamforming can enable a transmitted signal and a channel to be roughly matched in a simpler way. A dimension of an equivalent channel formed after the analog beamforming are smaller than the number of actual antennas, thus the number of AD/DA conversion devices and the number of digital channels required in subsequent processes, and the corresponding baseband processing complexity can be greatly reduced. The residual interference from the analog beamforming can be processed again in a digital domain, so as to ensure the quality of MU-MIMO transmission. As compared to the all-digital beamforming, the digital-analog hybrid beamforming is a compromise between performance and complexity, and has a high application prospect in high-frequency, wide-bandwidth, or multi-antenna systems.

Regarding High Frequency Band

In the research of the next generation communication system after 4G, an operating frequency band supported by a system is increased to more than 6 GHz, up to about 100 GHz. The high frequency band has relatively abundant idle frequency resources, which can provide greater throughput for data transmission. At present, 3GPP has completed the modeling of high-frequency channels. As compared with a low-frequency band, high-frequency signals have shorter wavelengths, more antenna elements can be arranged on a panel of the same size; and a beam formed by using the beamforming technology has a high directivity and narrower lobes. Therefore, the combination of large-scale antennas and high-frequency communications is also one of the future trends.

Regarding Beam Measurement and Beam Reporting

Beams from analog beamforming are transmitted in a full bandwidth, and array elements in each polarization direction on the panel of each high-frequency antenna array can transmit analog beams only in a time division multiplexed (TDM) manner. A shaping weight of the analog beam is obtained by adjusting parameters of an equipment such as a phase shifter of an RF front-end module.

At present, in academia and industry, training of analog beamforming vectors is usually performed in a polling manner, that is, the array elements in each polarization direction of each antenna panel sequentially transmit training signals (that is, candidate shaping vectors) at an agreed time in a TDM manner. After performing beam measurement, a terminal feeds back a beam report, for a network side to transmit an analog beam in the next transmission service by using shaping vectors used by the training signals.

A network side configures setting information about the beam reporting for a UE through high-level signaling, that is, reporting setting, which includes content information about the beam reporting, time-domain messages related to the beam reporting (periodic, aperiodic, or semi-persistent), and information about frequency-domain granularity (frequency granularity) of the beam reporting. The content information in beam reporting may include: identification information about at least one optimal transmission beam selected by the UE, a physical layer measurement result of a beam selected by the UE (such as physical layer reference signal received power (L1-RSRP)), and grouping information about the selected beam.

Regarding Beam Failure Recovery Mechanism

In a high-frequency communication system, since a radio signal has a relatively short wavelength, cases such as that signal propagation is blocked are likely to occur, which cause the signal propagation to be interrupted. It takes a long time for wireless link reconstruction by using the related technology. Accordingly, a beam failure recovery mechanism is proposed, which includes monitoring a beam failure detection reference signal at a physical layer, and evaluating whether the quality of the reference signal satisfies a beam failure trigger condition, that is, a beam report is triggered when a beam failure event occurs. Once this condition is satisfied, a UE may transmit a beam failure recovery request to a base station, and the request may include a new candidate beam recommended to the base station. After receiving the request, the base station may transmit a response signaling to the UE, and the response signaling may include switching to a new candidate beam, or restarting a beam search, or other indication. This beam failure recovery mechanism can make the UE or the base station quickly switch to a standby beam pair link (BPL, including a transmission beam and a reception beam) to continue transmitting control messages and data, thereby achieving a rapid beam recovery.

Regarding Realization of Terminal Antenna Switching

In the current design of terminal products, a metal housing is mainly considered, two antennas are respectively deemed as a master antenna and a secondary antenna, which are arranged at different positions of a terminal, for example, respectively at the upper and the lower ends of the back of the terminal. It is easy for a case where a certain antenna of the terminal is blocked to occur during a user using a terminal with a metal housing, such as the user holding the terminal in his or her hand.

For future 5G terminals, high-frequency antennas are usually set by using an antenna panel, for example, two panels. Similarly, a case where an antenna panel of a terminal is blocked may also occur.

However, in the aforementioned beam failure recovery mechanism, a determination is made by monitoring L1-RSRP of a beam, and it is impossible to determine whether an antenna panel is blocked. There is still a problem that effective transmission cannot be performed after switching.

SUMMARY

In a first aspect, the present disclosure provides a beam switching method, which includes:
monitoring whether a first blockage event occurs to an antenna of a terminal; and
transmitting a beam switching request to a network-side device, in a case that the first blockage event occurs,
where the first blockage event includes that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

In a second aspect, the present disclosure provides a beam switching method, which includes:
monitoring received signal strength information of at least one beam link; and
determining that a second blockage event occurs to an antenna of a terminal and transmitting a beam switching request to a network-side device, in a case that the number of beam links whose received signal strength information meets a second preset condition is greater than or equal to a third predetermined number.

In a third aspect, the present disclosure provides a mobile terminal, which includes:
a first monitoring module, configured to monitor whether a first blockage event occurs to an antenna of a terminal; and
a first processing module, configured to transmit a beam switching request to a network-side device, in a case that the first blockage event occurs,
where the first blockage event includes that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

In a fourth aspect, the present disclosure provides a mobile terminal, which includes:
a second monitoring module, configured to monitor received signal strength information of at least one beam link; and
a second processing module, configured to determine that a second blockage event occurs to an antenna of a terminal and transmit a beam switching request to a network-side device, in a case that the number of beam links whose received signal strength information meets a second preset condition is greater than or equal to a third predetermined number.

In a fifth aspect, the present disclosure provides a mobile terminal, which includes a memory, a processor, and a program that is stored on the memory and executable on the processor. The processor is configured to execute the program to perform steps in the beam switching method as described in the above first aspect.

In a sixth aspect, the present disclosure provides a mobile terminal, which includes a memory, a processor, and a program that is stored on the memory and executable on the processor. The processor is configured to execute the program to perform steps in the beam switching method as described in the above second aspect.

In a seventh aspect, the present disclosure provides a computer-readable storage medium, having a program stored thereon. The program is executed by a processor to perform steps in the beam switching method as described in the above first aspect and/or the above second aspect.

BRIEF DESCRIPTION OF THE DRAWINGS

In order to more clearly illustrate technical solutions of embodiments of the present disclosure, drawings to be used in the description of the embodiments of the present disclosure will be described briefly below. Obviously, the drawings in the following description are merely some embodiments of the present disclosure. For those skilled in the art, other drawings can be further obtained according to these drawings without creative effort.

DETAILED DESCRIPTION

Technical solutions of embodiments of the present disclosure will be clearly and completely described below in conjunction with the drawings of the embodiments of the present disclosure. It is apparent that the described embodiments are a part of the embodiments of the present disclosure, rather than all of them. Based on the embodiments in the present disclosure, many other embodiments obtained by those skilled in the art without creative effort shall fall within the scope of the present disclosure.

Figure 1:
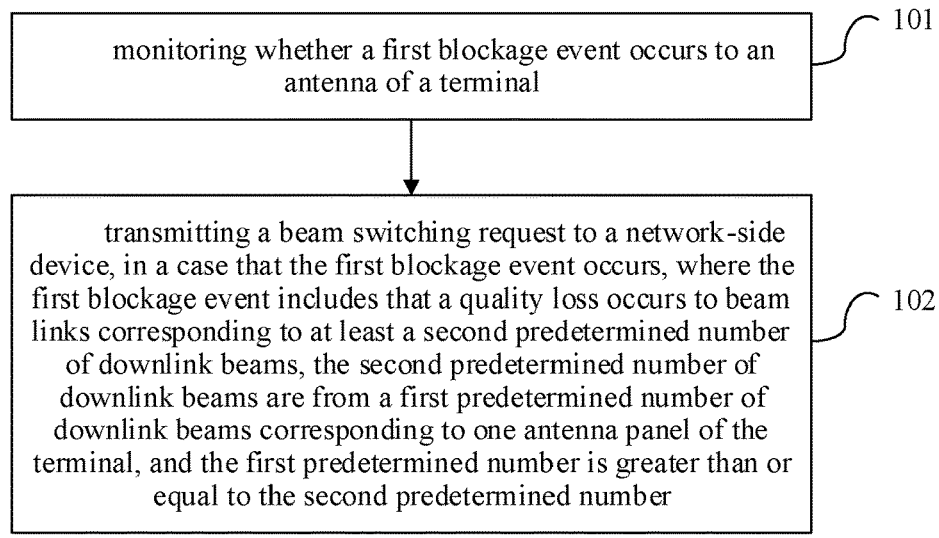
FIG. 1 is a flowchart of steps of a beam switching method according to an embodiment of the present disclosure.

As shown in FIG. 1, a beam switching method is provided according to an embodiment of the present disclosure, which includes steps 101 and 102.

Step 101 includes: monitoring whether a first blockage event occurs to an antenna of a terminal.

In this step, by determining whether the first blockage event occurs to the antenna of the terminal, whether a quality loss occurs to beam links corresponding to at least a second predetermined number of downlink beams among a first predetermined number of downlink beams corresponding to a single antenna panel of the terminal, so as to know whether an antenna panel of the mobile terminal is blocked (due to handhold). The antenna panel is connected to and controlled by a radio frequency (RF) module in the terminal.

Step 102 includes: transmitting a beam switching request to a network-side device, in a case that the first blockage event occurs, where the first blockage event includes that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

In this step, it is determined that a first blockage event occurs according to the monitoring in step 101, that is, a quality loss occurs to the beam links corresponding to at least the second predetermined number of downlink beams among the first predetermined number of downlink beams corresponding to the single antenna panel of the terminal.

Later, a beam switching request may be transmitted to the network-side device for requesting to switch to another good beam link. It should be known that the beam switching request herein may be a dedicated request message corresponding to the first blockage event, or a new use of a beam failure recovery request message in the beam failure recovery mechanism.

In this way, based on the beam switching method in the embodiment of the present disclosure, by monitoring whether a first blockage event occurs to an antenna of a terminal, a beam switching request is able to transmitted to the network-side device in time when the first blockage event occurs, so that the network-side device instructs the terminal to timely switch to a beam link corresponding to an antenna panel where no blockage event occurs, thereby avoiding interruption of transmissions and achieving effective transmissions.

The first predetermined number is set based on the number of downlink beams corresponding to a same antenna panel of a terminal, which may be pre-agreed through a protocol, or configured by a network-side device, or actively set by a terminal. Similarly, the second predetermined number may be predefined through a protocol, or configured by a network-side device, or separately set by a terminal, and is smaller than the first predetermined number. Of course, the first predetermined number and the second predetermined number may be further optimized based on test experiments.

Figure 2:
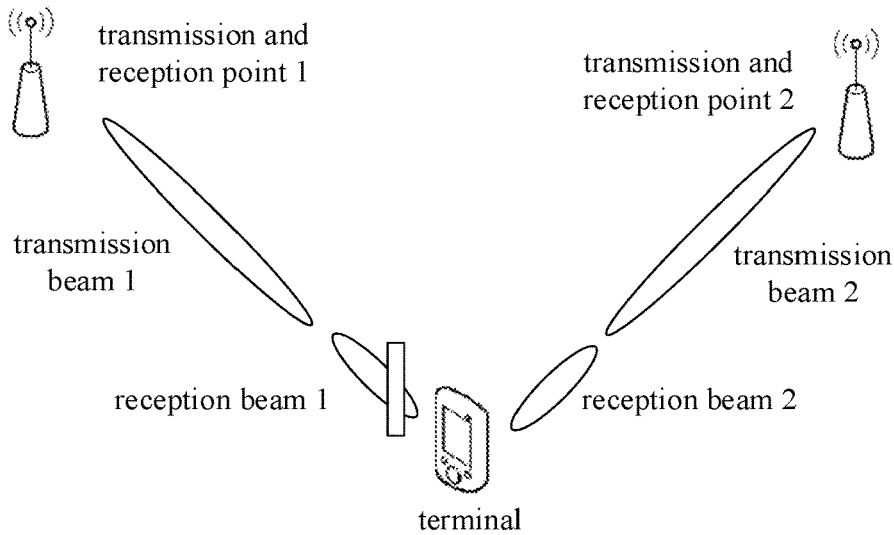
FIG. 2 is a schematic diagram of beam transmission between a user equipment and a transmission and reception point.

As shown in FIG. 2, a user equipment (UE) A is connected to two transmission and reception points (TRPs) of the same base station. The UE A has two antenna panels, which are a panel 1 and a panel 2. Taking the panel 1 as an example, the panel 1 supports two downlink beams, the first predetermined number is set to 2, and the second predetermined number is set to 2. It is assumed that a user holds the panel 1 during use. In this case, then UE may determine that a first blockage event (blockage event 1) has occurred by learning that a quality loss occurs to beam links to which at least two downlink beams of the panel 1 belong.

Figure 3:
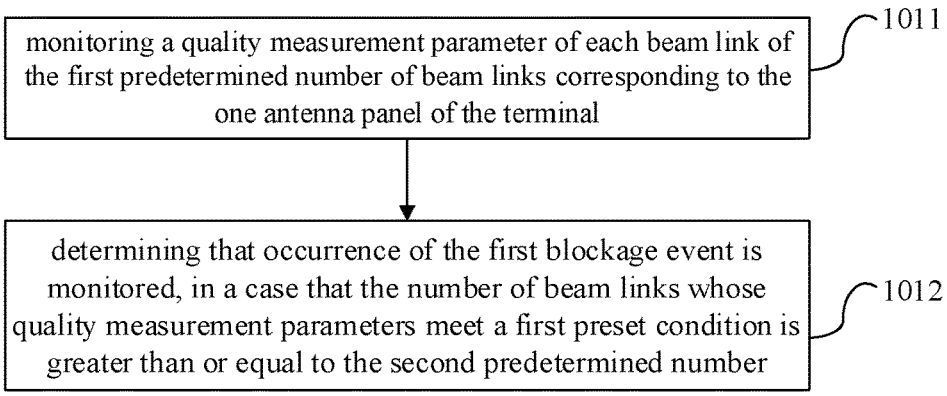
FIG. 3 is a flowchart of specific steps of the method shown in FIG. 1.

In an embodiment of the present disclosure, as shown in FIG. 3, step 101 includes steps 1011 and 1012.

Step 1011 includes: monitoring a quality measurement parameter of each beam link of the first predetermined number of beam links corresponding to the one antenna panel of the terminal.

In this step, based on the quality measurement parameters set to determine whether a quality loss occurs on the beam links, the quality measurement parameter of each beam link of the first predetermined number of beam links corresponding to the one antenna panel of the terminal is detected for the next execution.

Step 1012 includes: determining that occurrence of the first blockage event is monitored, in a case that the number of beam links whose quality measurement parameters meet a first preset condition is greater than or equal to the second predetermined number.

In this step, it is determined that the occurrence of the first blockage event has been monitored, in a case that the number of beam links whose quality measurement parameters detected in step 1011 meet a first preset condition is greater than or equal to the second predetermined number.

In the steps, by monitoring quality measurement parameters of beam links corresponding to a single antenna panel of a terminal, it is able to determine whether the quality measurement parameters of the beam links meet the corresponding first preset condition, and whether a quality loss has occurred to the beam links can be known. Accordingly, when the number of beam links whose quality measurement parameters meet the corresponding first preset condition is greater than or equal to a second predetermined number, it is determined that the occurrence of the first blockage event has been monitored, thereby ensuring that a case where an antenna panel is blocked can be detected in time.

Continuing the above example, based on steps 1011 and 1012, quality measurement parameters of beam links corresponding to two downlink beams of the panel 1 can be monitored, and it is able to determine that the occurrence of the first blockage event has been monitored, when the quality measurement parameter of each of the two beam links meets the first preset condition.

In addition, in an embodiment, to avoid the particularity of monitored data, each of the quality measurement parameters is a statistical average of multiple quality measurement parameters of a beam link, and the multiple quality measurement parameters of the beam link are monitored within a predetermined time period or within a time period configured by the network side device.

In this way, when the monitored quality measurement parameter is compared with a threshold corresponding to the first preset condition, a statistical average value of multiple measurement results within a predetermined time period or within a time period configured by the network side device may be selected to compare with the threshold, thereby improving the accuracy of measurements and the accuracy of event determination.

Specifically, the quality measurement parameter of each beam link includes at least one of: a received signal strength indicator (RSSI) of the beam link or a reference signal received power (RSRP) of the beam link. In a case that the quality measurement parameter includes the RSSI, the first preset condition includes that the RSSI is smaller than a predetermined RSSI threshold; in a case that the quality measurement parameter includes the RSRP, the first preset condition includes that the RSRP is lower than a predetermined RSRP threshold; or in a case that the quality measurement parameter includes the RSSI and the RSRP, the first preset condition includes that the RSSI is smaller than a predetermined RSSI threshold and the RSRP is lower than a predetermined RSRP threshold.

In the embodiment of the present disclosure, the quality measurement parameter may be RSSI, or RSRP, or a combination of RSSI and RSRP, which, of course, may also be other performance parameters of link quality such as a signal-to-noise ratio. Therefore, the first preset conditions corresponding to different quality measurement parameters are different. In a case that the quality measurement parameter includes only the RSSI, the first preset condition is that the RSSI of a beam link is smaller than a predetermined RSSI threshold; in a case that the quality measurement parameter includes only the RSRP, the first preset condition is that the RSRP of a beam link is lower than a predetermined RSRP threshold; or in a case that the quality measurement parameter includes the RSSI and the RSRP, the first preset condition is that the RSSI of a beam link is smaller than a predetermined RSSI threshold and the RSRP of the beam link is lower than a predetermined RSRP threshold.

Since the RSRP is a physical layer RSRP (L1-RSRP), obtaining the RSRP depends on a downlink reference signal (such as a channel state information reference signal CSI-RS)), and it may take a certain amount of time to obtain the RSRP. Therefore, it is optional to use the RSSI as a quality measurement parameter. Continuing the above example, the occurrence of the first blockage event may be determined by monitoring that RSSIs of beam links corresponding to at least two downlink beams of panel 1 are smaller than a predetermined RSSI threshold. In a case that the network transmits a CSI-RS during measurement, RSSI, or L1-RSRP, or both of them can be used as a quality measurement parameter. In this way, that the antenna panel is blocked can be found or monitored timely and quickly.

After the occurrence of the first blockage event has been monitored, a beam switching request may be transmitted to a network-side device. In the beam switching method in an embodiment of the present disclosure, based on the foregoing embodiments, the transmitting the beam switching request to the network-side device in step 102 includes: transmitting the beam switching request to the network-side device within a measurement time window of a beam failure event, and resetting a measurement occasion of the measurement time window to a start point of the time window.

Herein, based on a measurement time window of a beam failure event set in a beam failure recovery mechanism, the beam switching request can be transmitted to the network-side device within the measurement time window without waiting for an end point of the measurement time window, thereby achieving a timely transmission of beam switching requests. In addition, in order to avoid repeatedly switching, the measurement occasion of the measurement time window is reset to the start point of a time window.

Optionally, the transmitting the beam switching request to the network-side device in step 102 includes: transmitting the beam switching request to the network-side device and setting a value of a timer of a beam failure event to zero, within a timing length of the timer.

Herein, based on a timing length of a timer of a beam failure event defined in a beam failure recovery mechanism, the beam switching request can be transmitted to the network-side device within the timing length without waiting for the ending of the time counting, thereby achieving a timely transmission of beam switching requests. Moreover, in order to avoid repetition of switching, the timer may be further zero cleared.

Optionally, the transmitting the beam switching request to the network-side device in step 102 includes: transmitting the beam switching request to the network-side device and setting the number of performed measurements of a beam failure event to zero, before the predetermined number of measurements of the beam failure event have been completed.

Herein, based on a predetermined number of measurements of a beam failure event defined in a beam failure recovery mechanism, before the predetermined number of measurements of the beam failure event have been completed, a beam switching request can be transmitted to a network-side device without waiting for the expiring of the predetermined number, thereby achieving a timely transmission of beam switching requests. Moreover, in order to avoid repetition of switching, the number of performed measurements may be further zero cleared.

Figure 4:
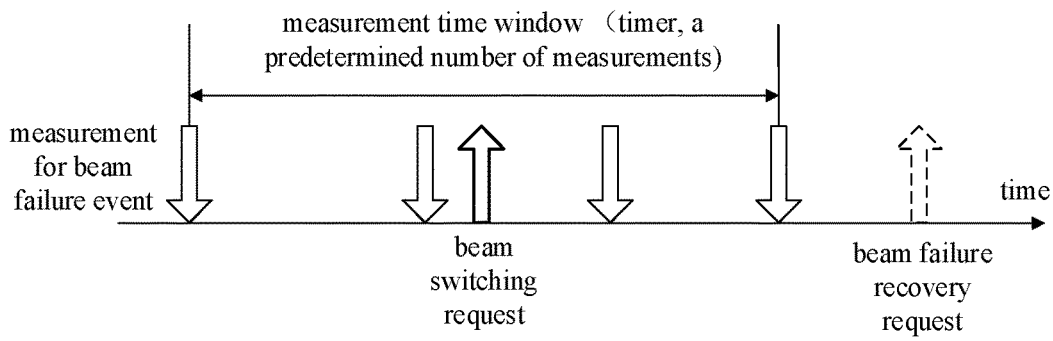
FIG. 4 is a schematic diagram of a time of transmitting a beam switching request according to an embodiment of the present disclosure.

FIG. 4 shows a measurement time window of a beam failure event (a timing length of a timer and a predetermined number of measurements). In a case that a user equipment (UE) monitors that a first blockage event occurs within the measurement time window of the beam failure event (within the timing length of the timer, and before the predetermined number of measurements are completed), the UE directly transmits a beam switching request to a network-side device without waiting for the measurement of the beam failure event to be completely performed before reporting, thereby realizing the timeliness of reporting.

In addition, in an embodiment of the present disclosure, a step of transmitting a beam switching request to a network-side device in step 102 includes: transmitting the beam switching request to the network-side device on a target resource. The target resource includes a reserved resource configured by the network-side device for the terminal, or a resource for transmitting a beam failure recovery request that is configured by the network-side device for the terminal.

Herein, the target resource for transmitting the beam switching request can not only use the reserved resources (uplink resources) configured by the network-side device for the terminal, but can also use resources for transmitting a beam failure recovery request that are configured by the network-side device for the terminal, so as to improve utilization of resources, and reduce unnecessary consumption of resources. The transmission manner may be a manner using a low-frequency signal, beam scanning, a wide beam, etc., which are not listed herein one by one.

In an embodiment of the present disclosure, specifically, the beam switching request includes at least one of: a trigger message for the occurrence of the first blockage event, information about a recommended downlink beam to be switched, information about downlink beams with the quality loss, measurement values of the quality measurement parameters, or indication information indicating a reason for transmitting the beam switching request. The information about the downlink beam to be switched includes an identifier of the downlink beam to be switched. The information about the downlink beams with the quality loss includes the number of downlink beams to which the quality loss occur, and an identifier of each downlink beam to which the quality loss occurs.

A terminal reports a beam switching request to a network-side device. The beam switching request includes at least one of: a trigger message for the occurrence of the first blockage event, information about a recommended downlink beam to be switched, information about a downlink beam with the quality loss, a measurement value of a quality measurement parameter, or indication information indicating a reason for transmitting the beam switching request. Therefore, the network-side device can know the occurrence of the first blockage event and instruct the terminal to perform beam switching.

Further specifically, the information about the downlink beam to be switched includes an RSSI and/or an RSRP of a beam link corresponding to the downlink beam to be switched.

Accordingly, in an embodiment of the present disclosure, after transmitting the beam switching request to the network-side device, the method further includes:

receiving a beam switching response fed back by the network-side device according to the beam switching request; and performing beam switching based on indication of the beam switching response, where the beam switching response is used to indicate the terminal to directly switch to a target beam, or the beam switching response is used to indicate the terminal to perform beam training again and relevant parameter information of the beam training.

A beam switching response fed back by the network-side device according to the beam switching request is received, and the beam switching is performed based on the beam switching response. The beam switching requests have different content. In a case that a beam switching request includes information about a recommended and to-be-switched downlink beam, or a target beam can be determined from the content in the beam switching request according to a predetermined switching rule, the beam switching response can be used to indicate the terminal to switch directly to the target beam (the recommended and to-be-switched downlink beam). In a case that the network-side device cannot directly determine the target beam based on the received beam switching request, the beam switching response is used to indicate the terminal to re-perform beam training and relevant parameter information of beam training, and a beam with a better performance is determined by new beam training, for transmission.

In view the above, based on the beam switching method in the embodiments of the present disclosure, by monitoring whether a first blockage event occurs to an antenna of a terminal (the first blockage event is that a quality loss occurs to beam links corresponding to at least the second predetermined number of downlink beams among the first predetermined number of downlink beams corresponding to a single antenna panel of the terminal), a beam switching request is able to transmitted to a network-side device in time when the first blockage event occurs. Therefore, a network-side device instructs the terminal to timely switch to a beam link corresponding to an antenna panel where no blockage event occurs, thereby avoiding interruption of transmissions and achieving effective transmissions.

Figure 5:
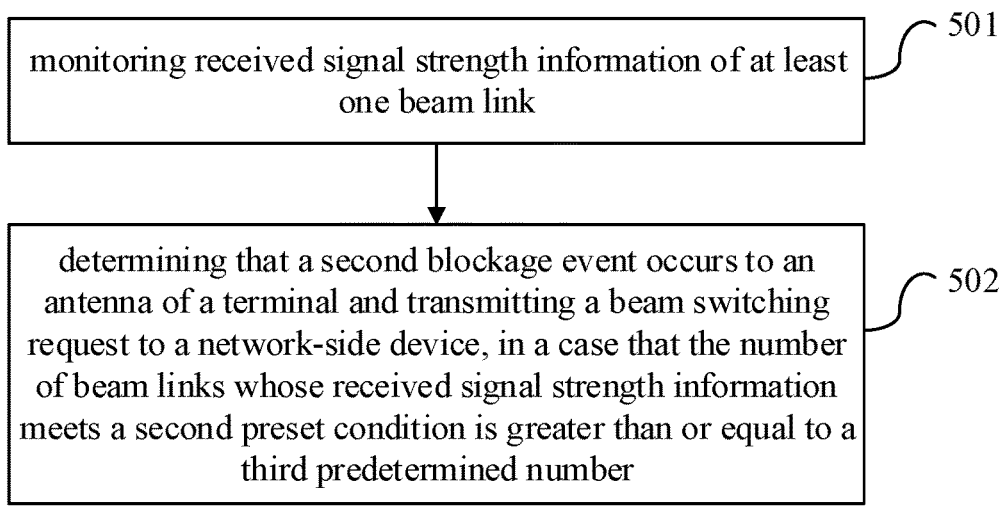
FIG. 5 is a flowchart of steps of a beam switching method according to another embodiment of the present disclosure.

As shown in FIG. 5, a beam switching method is provided according to an embodiment of the present disclosure, which includes steps 501 and 502.

Step 501 includes: monitoring received signal strength information of at least one beam link.

In this step, the quality of the at least one beam link is timely known by monitoring the received signal strength information of at least one beam link of a terminal.

Step 502 includes: determining that a second blockage event occurs to an antenna of a terminal and transmitting a beam switching request to a network-side device, in a case that the number of beam links whose received signal strength information meets a second preset condition is greater than or equal to a third predetermined number.

In this step, according to the monitoring of the received signal strength information of the beam link in the above step 501, when received signal strength information of beam links, the number of which is greater than or equal to a third predetermined number, satisfies the second preset condition, it is determined that the second blockage event of the antenna of the terminal has been monitored, the beam switching request is transmitted to the network-side device, so as to request to switch to another beam link with a good performance. It should be known that the beam switching request may be a dedicated request message corresponding to the second blockage event, or a beam failure recovery request message in the beam failure recovery mechanism may be reused as the beam switching request.

In this way, by monitoring the received signal strength information of at least one beam link of a terminal, the beam switching method in the embodiment of the present disclosure can no longer rely on a downlink reference signal transmitted by a network-side device, and can timely transmit a beam switching request to the network-side device when the second blockage event occurs, so that the network-side device instructs the terminal to timely switch to another beam link with a good performance, thereby avoiding interruption of transmissions and achieving effective transmissions.

The third predetermined number may be predefined through a protocol, or configured by a network-side device, or actively set by a terminal.

The content shown in FIG. 2 is given as an example, and it is assumed that the third predetermined number is two. It is assumed that a user holds the panel 1 during use. In this case, the UE may determine that a second blockage event (blockage event 2) has occurred by monitoring that received signal strength information of two beam links of the panel 1 meets a second preset condition.

In addition, in an embodiment, to avoid the particularity of monitored data, the received signal strength information is a statistical average of a plurality of pieces of received signal strength information of a beam link, and the plurality of pieces of received signal strength information of the beam link is monitored within a predetermined time period or a time period that is configured by the network-side device.

In this way, when the received signal strength information as monitored is compared with a threshold corresponding to the second preset condition, a statistical average value of multiple measurement results within a time period predetermined or configured by the network side device is compared with the threshold, whereby improving the accuracy of measurements and the accuracy of event determination.

Optionally, the received signal strength information of the at least one beam link includes: a received signal strength indicator (RSSI) of the beam link, and the second preset condition includes that the RSSI is smaller than a predetermined RSSI threshold.

The second preset condition herein is set corresponding to the RSSI, which is the received signal strength information of the beam link. When the received signal strength information of a beam link is other measurement parameters, the second preset condition may be set accordingly.

However, during a measurement, it may happen that the network sends a downlink reference signal (such as CSI-RS). In this case, the method further includes: obtaining a reference signal received power (RSRP) of a beam link, in a case that a downlink reference signal transmitted by the network-side device is received on the beam link when the received signal strength information of the beam link is monitored. The determining that the second blockage event occurs to the antenna of the terminal and transmitting the beam switching request to the network-side device, in a case that the number of beam links whose received signal strength information meets the second preset condition is greater than or equal to the third predetermined number includes: determining that the second blockage event occurs to the antenna of the terminal and transmitting the beam switching request to the network-side device, in a case that the number of beam links whose received signal strength information meets the second preset condition is greater than or equal to the third predetermined number, and that the number of beam links whose RSRP is lower than a predetermined RSRP threshold is greater than or equal to a fourth predetermined number.

In this way, after the downlink reference signal transmitted by the network-side device is received on a beam link, the RSRP of the beam link may be obtained. In a case that the number of beam links whose received signal strength information meets the second preset condition is greater than or equal to the third predetermined number, and that the number of beam links whose RSRP is lower than the predetermined RSRP threshold is greater than or equal to the fourth predetermined number, the second blockage event of the antenna of the terminal is determined to be monitored, the beam switching request is transmitted to the network-side device.

Therefore, when the received signal strength information (such as RSSI) as monitored is compared with a threshold corresponding to the second preset condition, or when RSRP is compared with the predetermined RSRP threshold, a statistical average value of multiple measurement results within a predetermined time period or within a time period configured by the network side device may be selected to compare with the corresponding threshold.

After the occurrence of the second blockage event is detected, a beam switching request may be transmitted to the network-side device. The beam switching method in an embodiment of the present disclosure, based on the above embodiments, the transmitting the beam switching request to the network-side device in step 502 includes: transmitting the beam switching request to the network-side device within a measurement time window of a beam failure event, and resetting a measurement occasion of the measurement time window to an initial point of the time window.

Herein, based on a measurement time window of a beam failure event set in a beam failure recovery mechanism, the beam switching request can be transmitted to the network-side device within the measurement time window without waiting for an end point of the measurement time window, thereby achieving a timely transmission of beam switching requests. In addition, in order to avoid repeatedly switching, the measurement occasion of the measurement time window is reset to the start point of a time window.

Optionally, the transmitting the beam switching request to the network-side device in step 502 includes: transmitting the beam switching request to the network-side device and setting a value of a timer of a beam failure event to zero, within a timing length of the timer.

Herein, based on the timing length of a timer of a beam failure event defined in a beam failure recovery mechanism, the beam switching request can be transmitted to the network-side device within the timing length without waiting for the ending of the time counting, thereby achieving a timely transmission of beam switching requests. Moreover, in order to avoid repetition of switching, the timer may be further zero cleared.

Optionally, the transmitting the beam switching request to the network-side device in step 502 includes: transmitting the beam switching request to the network-side device and setting the number of performed measurements of a beam failure event to zero, before a predetermined number of measurements of the beam failure event are completed.

Herein, based on a predetermined number of measurements of a beam failure event defined in a beam failure recovery mechanism, before the predetermined number of measurements of the beam failure event have been completed, a beam switching request can be transmitted to a network-side device without waiting for the expiring of the predetermined number, thereby achieving a timely transmission of beam switching requests. Moreover, in order to avoid repetition of switching, the number of performed measurements may be further zero cleared.

FIG. 4 shows a measurement time window of a beam failure event (a timing length of a timer and a predetermined number of measurements). In a case that a UE monitors that a first blockage event occurs within the measurement time window of the beam failure event (within the timing length of the timer, and before the predetermined number of measurements are completed), the UE directly transmits a beam switching request to a network-side device without waiting for the measurement of the beam failure event to be completely performed before reporting, thereby realizing the timeliness of reporting.

In addition, in an embodiment of the present disclosure, a step of transmitting a beam switching request to a network-side device in step 502 includes: transmitting the beam switching request to the network-side device on a target resource. The target resource includes a reserved resource configured by the network-side device for the terminal, or a resource for transmitting a beam failure recovery request that is configured by the network-side device for the terminal.

Herein, the target resource for transmitting the beam switching request can not only use the reserved resources (uplink resources) configured by the network-side device for the terminal, but can also use resources for transmitting a beam failure recovery request that are configured by the network-side device for the terminal, so as to improve utilization of resources, and reduce unnecessary consumption of resources. The transmission manner may be a manner using a low-frequency signal, beam scanning, a wide beam, etc., which are not listed herein one by one.

In an embodiment of the present disclosure, specifically, the beam switching request includes at least one of: a trigger message for occurrence of the second blockage event, information about a recommended downlink beam to be switched, information about a downlink beam whose received signal strength information meets the second preset condition, a measurement value of the received signal strength information of a beam link, or indication information indicating a reason for transmitting the beam switching request. The information about the downlink beam to be switched includes an identifier of the downlink beam to be switched. The information about the downlink beam whose received signal strength information meets the second preset condition includes the number of downlink beams whose received signal strength information meets the second preset condition, and an identifier of each downlink beam whose received signal strength information meets the second preset condition.

A terminal reports a beam switching request to a network-side device. The beam switching request includes at least one of: a trigger message for occurrence of the second blockage event, information about a recommended and to-be-switched downlink beam, information about a downlink beam whose received signal strength information meets the second preset condition, a measurement value of the received signal strength information of a beam link, or indication information indicating a reason for transmitting the beam switching request. Therefore, the network-side device can know the occurrence of the second blockage event and instruct the terminal to perform beam switching.

Further specifically, the information about the downlink beam to be switched includes an RSSI and/or an RSRP of a beam link corresponding to the downlink beam to be switched.

Accordingly, in an embodiment of the present disclosure, after transmitting the beam switching request to the network-side device, the method further includes:

receiving a beam switching response fed back by the network-side device according to the beam switching request; and performing beam switching based on indication of the beam switching response, where the beam switching response is used to indicate the terminal to directly switch to a target beam, or the beam switching response is used to indicate the terminal to re-perform beam training and indicate parameter information related to the beam training to the terminal.

A beam switching response fed back by the network-side device according to the beam switching request is received, and the beam switching is performed under an indication of the beam switching response. The beam switching requests have different content. In a case that a beam switching request includes information about a recommended and to-be-switched downlink beam, or a target beam can be determined from the content in the beam switching request according to a predetermined switching rule, the beam switching response can be used to indicate the terminal to switch directly to the target beam (the recommended and to-be-switched downlink beam). In a case that the network-side device cannot directly determine a target beam based on the received beam switching request, the beam switching response is used to indicate the terminal to re-perform beam training and indicate relevant parameter information of beam training to the terminal, and a beam with a better performance is determined through new beam training, for transmission.

In view the above, by monitoring the received signal strength information of at least one beam link of a terminal, the beam switching method in the embodiments of the present disclosure can no longer rely on a downlink reference signal transmitted by a network-side device, and can timely transmit a beam switching request to a network-side device when the second blockage event occurs, so that the network-side device instructs the terminal to timely switch to another beam link with a good performance, thereby avoiding interruption of transmissions and achieving effective transmissions.

Figure 6:
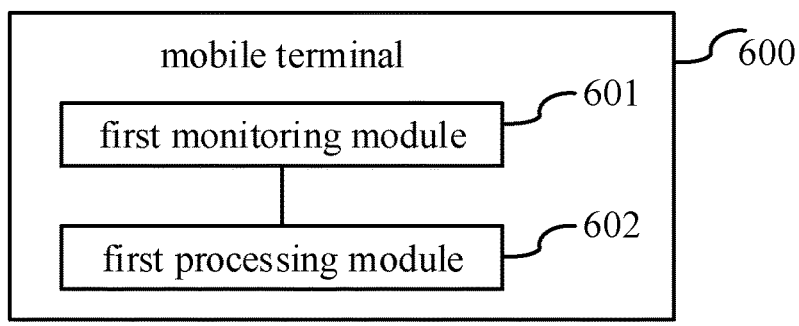
FIG. 6 is a schematic structural diagram of a mobile terminal according to an embodiment of the present disclosure.

FIG. 6 is a block diagram of a mobile terminal according to an embodiment of the present disclosure. The mobile terminal 600 shown in FIG. 6 includes a first monitoring module 601 and a first processing module 602.

The first monitoring module 601 is configured to monitor whether a first blockage event occurs to an antenna of a terminal. The first processing module 602 is configured to transmit a beam switching request to a network-side device, in a case that the first blockage event occurs. The first blockage event includes that a quality loss occurs to beam links to which at least a second predetermined number of downlink beams belong, the second predetermined number of downlink beams are from a first predetermined number of downlink beams corresponding to one antenna panel of the terminal, and the first predetermined number is greater than or equal to the second predetermined number.

Figure 7:
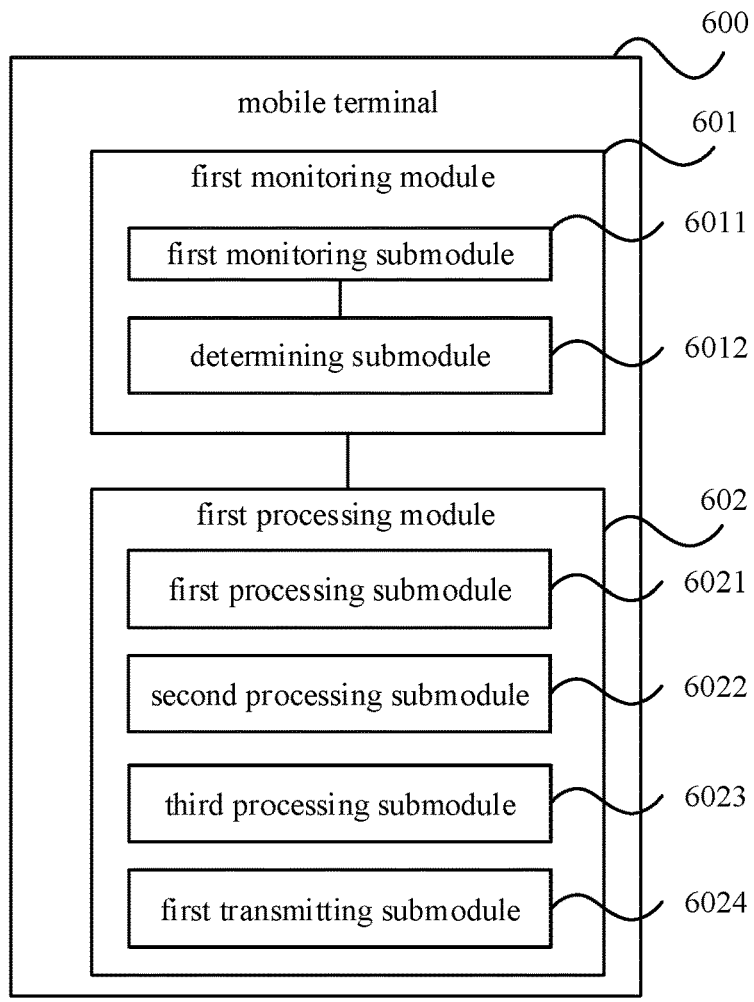
FIG. 7 is a first schematic diagram of a specific structure of the mobile terminal shown in FIG. 6.

Optionally, as shown in FIG. 7 on the basis of FIG. 6, the first monitoring module 601 includes:

a first monitoring submodule 6011, configured to monitor a quality measurement parameter of each beam link of the first predetermined number of beam links corresponding to the one antenna panel of the terminal; and a determining submodule 6012, configured to determine that occurrence of the first blockage event is monitored, in a case that the number of beam links whose quality measurement parameters meet a first preset condition is greater than or equal to the second predetermined number.

Optionally, the quality measurement parameter of each beam link includes at least one of: a received signal strength indicator (RSSI) of the beam link or a reference signal received power (RSRP) of the beam link;

in a case that the quality measurement parameter includes the RSSI, the first preset condition includes that the RSSI is smaller than a predetermined RSSI threshold;

in a case that the quality measurement parameter includes the RSRP, the first preset condition includes that the RSRP is lower than a predetermined RSRP threshold; or in a case that the quality measurement parameter includes the RSSI and the RSRP, the first preset condition includes that the RSSI is smaller than a predetermined RSSI threshold and the RSRP is lower than a predetermined RSRP threshold.

Optionally, the first processing module 602 includes a first processing submodule 6021, configured to transmit the beam switching request to the network-side device within a measurement time window of a beam failure event; and reset a measurement occasion of the measurement time window to an initial point of the time window.

Optionally, the first processing module 602 includes a second processing submodule 6022, configured to transmit the beam switching request to the network-side device and clear a timer of a beam failure event to zero, within a timing length of the timer.

Optionally, the first processing module 602 includes a third processing submodule 6023, configured to transmit the beam switching request to the network-side device and set the number of performed measurements of a beam failure event to zero, before a predetermined number of measurements of the beam failure event have been completed.

Optionally, the first processing module 602 includes a first transmitting submodule 6024, configured to transmit the beam switching request to a network-side device on a target resource. The target resource includes a reserved resource configured by the network-side device for the terminal, or a resource for transmitting a beam failure recovery request that is configured by the network-side device for the terminal.

Optionally, the beam switching request includes at least one of: a trigger message for the occurrence of the first blockage event, information about a recommended downlink beam to be switched, information about downlink beams with the quality loss, measurement values of the quality measurement parameters, or indication information indicating a reason for transmitting the beam switching request. The information about the downlink beam to be switched includes an identifier of the downlink beam to be switched. The information about the downlink beams with the quality loss includes the number of the downlink beams with the quality loss, and an identifier of each downlink beam with the quality loss.

Optionally, the information about each downlink beam to be switched includes an RSRP and/or an RSSI of a beam link to which the downlink beam to be switched belongs.

Figure 8:
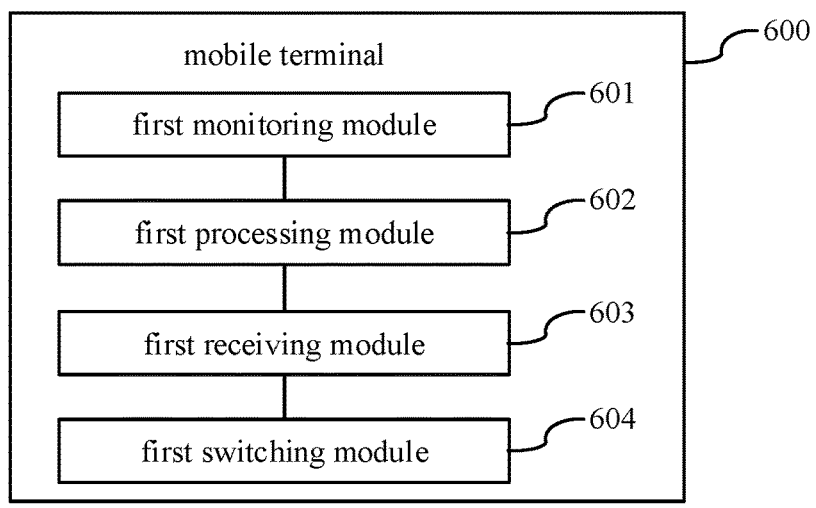
FIG. 8 is a second schematic diagram of a specific structure of the mobile terminal shown in FIG. 6.

Optionally, as shown in FIG. 8 based on FIG. 6, the mobile terminal further includes: a first receiving module 603, configured to receive a beam switching response fed back by the network-side device according to the beam switching request; and a first switching module 604, configured to perform beam switching based on indication of the beam switching response. The beam switching response is used to indicate the terminal to directly switch to the target beam; or the beam switching response is used to indicate the terminal to re-perform beam training and indicate parameter information related to the beam training to the terminal.

Optionally, each of the quality measurement parameters is a statistical average of a plurality of quality measurement parameters of a beam link, and the plurality of quality measurement parameters of the beam link is monitored within a predetermined time period that is preset or a predetermined time period that is configured by the network-side device.

The mobile terminal 600 can implement various processes performed by the mobile terminal in the method embodiments corresponding to FIG. 1 and FIG. 3. To avoid repetition, details are not described herein again. The mobile terminal 600 monitors whether a first blockage event occurs to an antenna of a terminal (the first blockage event is that a quality loss occurs to beam links corresponding to at least the second predetermined number of downlink beams among the first predetermined number of downlink beams corresponding to a single antenna panel of the terminal), and can transmit a beam switching request to a network-side device in time when the first blockage event occurs. Therefore, a network-side device instructs the terminal to timely switch to a beam link corresponding to an antenna panel where no blockage event occurs, thereby avoiding interruption of transmissions and achieving effective transmissions.

Figure 9:
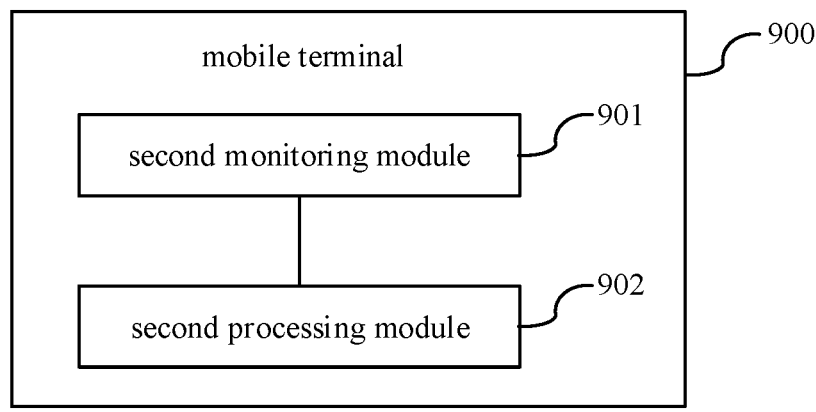
FIG. 9 is a schematic structural diagram of a mobile terminal according to another embodiment of the present disclosure.

FIG. 9 is a block diagram of a mobile terminal according to an embodiment of the present disclosure. The mobile terminal 900 shown in FIG. 9 includes a second monitoring module 901 and a second processing module 902. The second monitoring module 901 is configured to monitor received signal strength information of at least one beam link. The second processing module 902 is configured to determine that a second blockage event occurs to an antenna of a terminal and transmit a beam switching request to a network-side device, in a case that the number of beam links whose received signal strength information meets a second preset condition is greater than or equal to a third predetermined number.

Optionally, the received signal strength information of the at least one beam link includes: a received signal strength indicator (RSSI) of the beam link, and the second preset condition includes that the RSSI is smaller than a predetermined RSSI threshold.

Figure 10:
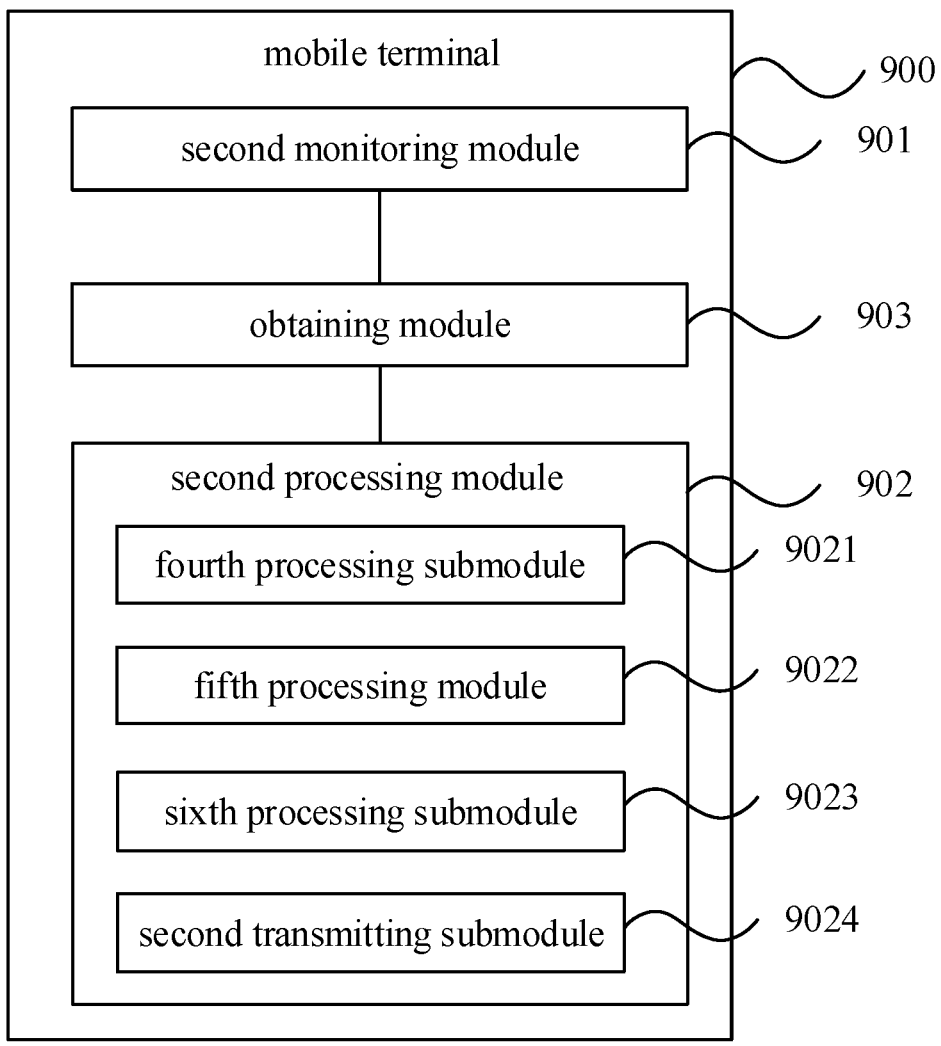
FIG. 10 is a first schematic diagram of a specific structure of the mobile terminal shown in FIG. 9.

On the basis of FIG. 9, optionally, as shown in FIG. 10, the mobile terminal 900 further includes: an obtaining module 903, configured to obtain a reference signal received power (RSRP) of a beam link, in a case that a downlink reference signal transmitted by the network-side device is received on the beam link when the received signal strength information of the beam link is monitored. The second processing module 902 is further configured to: determine that the second blockage event occurs to the antenna of the terminal and transmit the beam switching request to the network-side device, in a case that the number of beam links whose received signal strength information meets the second preset condition is greater than or equal to the third predetermined number, and that the number of beam links whose RSRP is lower than a predetermined RSRP threshold is greater than or equal to a fourth predetermined number.

Optionally, the second processing module 902 includes: a fourth processing submodule 9021, configured to transmit the beam switching request to the network-side device within a measurement time window of a first beam failure event, and reset a measurement occasion of the measurement time window to an initial point of the time window.

Optionally, the second processing module 902 includes: a fifth processing submodule 9022, configured to transmit the beam switching request to the network-side device and clear a timer of a beam failure event to zero, within a timing length of the timer.

Optionally, the second processing module 902 includes: a sixth processing submodule 9023, configured to transmit the beam switching request to the network-side device and set the number of performed measurements of a beam failure event to zero, before a predetermined number of measurements of the beam failure event are completed.

Optionally, the second processing module 902 includes: a second transmitting submodule 9024, configured to transmit the beam switching request to the network-side device on a target resource. The target resources include a reserved resource configured by the network-side device for the terminal, or a resource for transmitting a beam failure recovery request that is configured by the network-side device for the terminal.

Optionally, the beam switching request includes at least one of: a trigger message for occurrence of the second blockage event, information about a recommended downlink beam to be switched, information about the downlink beams whose received signal strength information meets the second preset condition, a measurement value of the received signal strength information of the beam links, or indication information indicating a reason for transmitting the beam switching request. The information about the downlink beam to be switched includes an identifier of the downlink beam to be switched. The information about the downlink beams whose received signal strength information meets the second preset condition includes the number of the downlink beams whose received signal strength information meets the second preset condition, and an identifier of each downlink beam, received signal strength information of which meets the second preset condition.

Optionally, the downlink beam information to be switched includes an RSRP and/or an RSSI of a beam link corresponding to the downlink beam to be switched.

Figure 11:
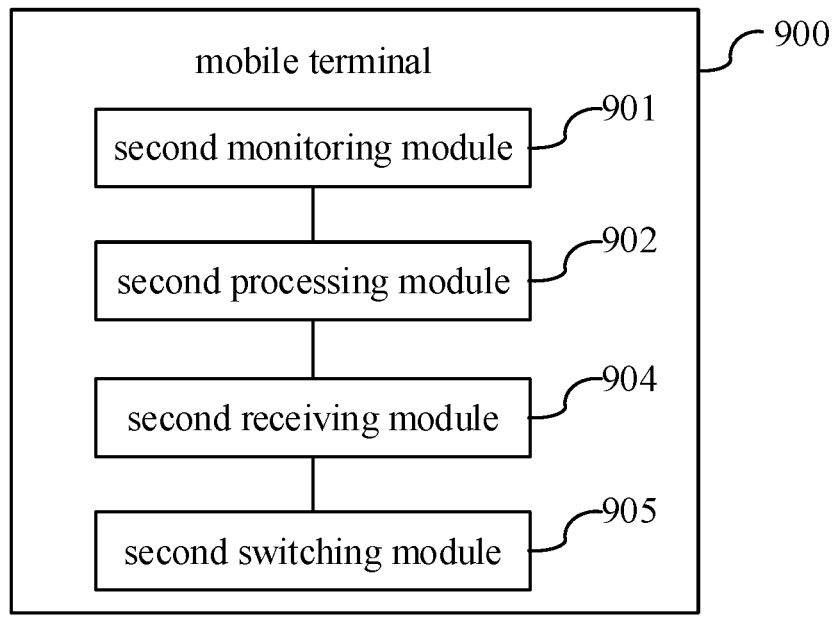
FIG. 11 is a second schematic diagram of a specific structure of the mobile terminal shown in FIG. 9.

Optionally, as shown in FIG. 11, the mobile terminal 900 based on FIG. 9 further includes: a second receiving module 904, configured to receive a beam switching response fed back by the network-side device according to the beam switching request; and a second switching module 905, configured to perform beam switching based on indication of the beam switching response. The beam switching response is used to indicate the terminal to directly switch to a target beam, or the beam switching response is used to indicate the terminal to re-perform beam training and indicate parameter information related to the beam training to the terminal.

Optionally, the received signal strength information is a statistical average of a plurality of pieces of received signal strength information of a beam link, and the plurality of pieces of received signal strength information of the beam link is monitored within a predetermined time period that is set in advance or a predetermined time period that is configured by the network-side device.

The mobile terminal 900 can implement various processes performed by the mobile terminal in the method embodiments corresponding to FIG. 5, which are not described herein again to avoid repetition. By monitoring the received signal strength information of at least one beam link of the terminal, the mobile terminal 900 can no longer rely on a downlink reference signal transmitted by a network, and can timely transmit a beam switching request to a network-side device when a second blockage event occurs, so that the network-side device instructs the terminal to timely switch to another beam link with a good performance, thereby avoiding interruption of transmission and achieving effective transmission.

A computer-readable storage medium is further provided according to another embodiment of the present disclosure, where a computer program is stored thereon. The program is executed by a processor to implement the following steps:

monitoring whether a first blockage event occurs to an antenna of a terminal; and transmitting a beam switching request to a network-side device, in a case that the first blockage event occurs, where the first blockage event includes that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

Optionally, the program is executed by the processor to further implement the following steps: monitoring a quality measurement parameter of each beam link of the first predetermined number of beam links corresponding to the one antenna panel of the terminal; and determining that occurrence of the first blockage event is monitored, in a case that the number of beam links whose quality measurement parameters meet a first preset condition is greater than or equal to the second predetermined number.

Optionally, the quality measurement parameter of each beam link includes at least one of: a received signal strength indicator (RSSI) of the beam link or a reference signal received power (RSRP) of the beam link. In a case that the quality measurement parameter includes the RSSI, the first preset condition includes that the RSSI is smaller than a predetermined RSSI threshold; in a case that the quality measurement parameter includes the RSRP, the first preset condition includes that the RSRP is lower than a predetermined RSRP threshold; or in a case that the quality measurement parameter includes the RSSI and the RSRP, the first preset condition includes that the RSSI is smaller than a predetermined RSSI threshold and the RSRP is lower than a predetermined RSRP threshold.

Optionally, the program is executed by the processor to further implement the following steps: transmitting the beam switching request to the network-side device within a measurement time window of a beam failure event, and resetting a measurement occasion of the measurement time window to an initial point of the time window.

Optionally, the program is executed by the processor to further implement the following steps: transmitting the beam switching request to the network-side device and setting a value of a timer of a beam failure event to zero, within a timing length of the timer.

Optionally, the program is executed by the processor to further perform the following steps: transmitting the beam switching request to the network-side device and setting the number of performed measurements of a beam failure event to zero, before a predetermined number of measurements of the beam failure event are completed.

Optionally, the program is executed by the processor to further implement the following steps: transmitting the beam switching request to the network-side device on a target resource, where the target resource includes a reserved resource configured by the network-side device for the terminal, or a resource for transmitting a beam failure recovery request that is configured by the network-side device for the terminal.

Optionally, the beam switching request includes at least one of: a trigger message for the occurrence of the first blockage event, information about a recommended downlink beam to be switched, information about downlink beams with the quality loss, measurement values of the quality measurement parameters, or indication information indicating a reason for transmitting the beam switching request. The information about the downlink beam to be switched includes an identifier of the downlink beam to be switched. The information about the downlink beams with the quality loss includes the number of the downlink beams with the quality loss, and an identifier of each downlink beam with the quality loss.

Optionally, the information about the downlink beam to be switched includes an RSRP and/or an RSSI of a beam link corresponding to the downlink beam to be switched.

Optionally, the program is executed by the processor to further implement the following steps: receiving a beam switching response fed back by the network-side device according to the beam switching request; and performing beam switching based on indication of the beam switching response, where the beam switching response is used to indicate the terminal to directly switch to a target beam, or the beam switching response is used to indicate the terminal to re-perform beam training and indicate parameter information related to the beam training to the terminal.

Optionally, each of the quality measurement parameters is a statistical average of a plurality of quality measurement parameters of a beam link, and the plurality of quality measurement parameters of the beam link is monitored within a time period that is predetermined or a time period that is configured by the network-side device.

A computer-readable storage medium is further provided according to another embodiment of the present disclosure, where a computer program is stored thereon. When the program is executed by a processor, the following steps are implemented:

monitoring received signal strength information of at least one beam link; and determining that a second blockage event occurs to an antenna of a terminal and transmitting a beam switching request to a network-side device, in a case that the number of beam links is greater than or equal to a third predetermined number, and received signal strength information of the beam links meets a second preset condition.

Optionally, the received signal strength information of the at least one beam link includes: a received signal strength indicator (RSSI) of the beam link, and the second preset condition includes that the RSSI is smaller than a predetermined RSSI threshold.

Optionally, the program is executed by the processor to further perform the following steps: obtaining a reference signal received power (RSRP) of a beam link, in a case that a downlink reference signal transmitted by the network-side device is received on the beam link when the received signal strength information of the beam link is monitored. The determining that the second blockage event occurs to the antenna of the terminal and transmitting the beam switching request to the network-side device, in a case that the number of beam links whose received signal strength information meets the second preset condition is greater than or equal to the third predetermined number includes: determining that the second blockage event occurs to the antenna of the terminal and transmitting the beam switching request to the network-side device, in a case that the number of beam links whose received signal strength information meets the second preset condition is greater than or equal to the third predetermined number, and that the number of beam links whose RSRP is lower than a predetermined RSRP threshold is greater than or equal to a fourth predetermined number.

Optionally, the program is executed by the processor to further perform the following steps: transmitting the beam switching request to the network-side device within a measurement time window of a beam failure event, and resetting a measurement occasion of the measurement time window to an initial point of the time window.

Optionally, the program is executed by the processor to further perform the following steps: transmitting the beam switching request to the network-side device and clearing a timer to zero, within a timing length of the timer of a beam failure event.

Optionally, the program is executed by the processor to further perform the following steps: transmitting the beam switching request to the network-side device and setting the number of performed measurements of a beam failure event to zero, before a predetermined number of measurements of the beam failure event are completed.

Optionally, the program is executed by the processor to further perform the following steps: transmitting the beam switching request to the network-side device on a target resource; where the target resource includes a reserved resource configured by the network-side device for the terminal, or a resource for transmitting a beam failure recovery request that is configured by the network-side device for the terminal.

Optionally, the beam switching request includes at least one of: a trigger message for occurrence of the second blockage event, information about a recommended downlink beam to be switched, information about a downlink beam whose received signal strength information meets the second preset condition, a measurement value of the received signal strength information of a beam link, or indication information indicating a reason for transmitting the beam switching request. The information about the downlink beam to be switched includes an identifier of the downlink beam to be switched. The information about the downlink beam whose received signal strength information meets the second preset condition includes the number of downlink beams whose received signal strength information meets the second preset condition, and an identifier of each downlink beam, received signal strength information of which meets the second preset condition.

Optionally, the information about the downlink beam to be switched includes at least one of: a received signal strength indicator (RSSI) or a reference signal received power (RSRP) of a beam link corresponding to the downlink beam to be switched.

Optionally, the program is executed by the processor to further perform the following steps: receiving a beam switching response fed back by the network-side device according to the beam switching request; and performing beam switching based on indication of the beam switching response, where the beam switching response is used to indicate the terminal to directly switch to a target beam, or the beam switching response is used to indicate the terminal to re-perform beam training and indicate parameter information related to the beam training to the terminal.

Optionally, the received signal strength information is a statistical average of a plurality of pieces of received signal strength information of a beam link, and the plurality of pieces of received signal strength information of the beam link is monitored within a predetermined time period that is set in advance or a predetermined time period that is configured by the network-side device.

A computer-readable medium includes permanent medium and non-persistent medium, or removable medium and non-removable medium, and information storage can be realized by using any method or technology. Information may be computer-readable instructions, data structures, modules of a program, or other data. Examples of the computer-readable medium include, but not limited to: storage technologies such as phase change random access memory (PRAM), static random access memory (SRAM), dynamic random access memory (DRAM), other types of random access memory (RAM), and read-only memory (ROM), electrically erasable programmable ROM (EEPROM), and flash memory; optical storages such as read-only disc ROM (CD-ROM), and digital versatile disc (DVD); magnetic storage devices such as cassette tape, and disk and tape storage; or any other non-transmission medium which may be used to store information that can be accessed by a computing device. As defined in the present specification, the computer-readable medium does not include transitory computer-readable media, such as modulated data signals and carrier waves.

Figure 12:
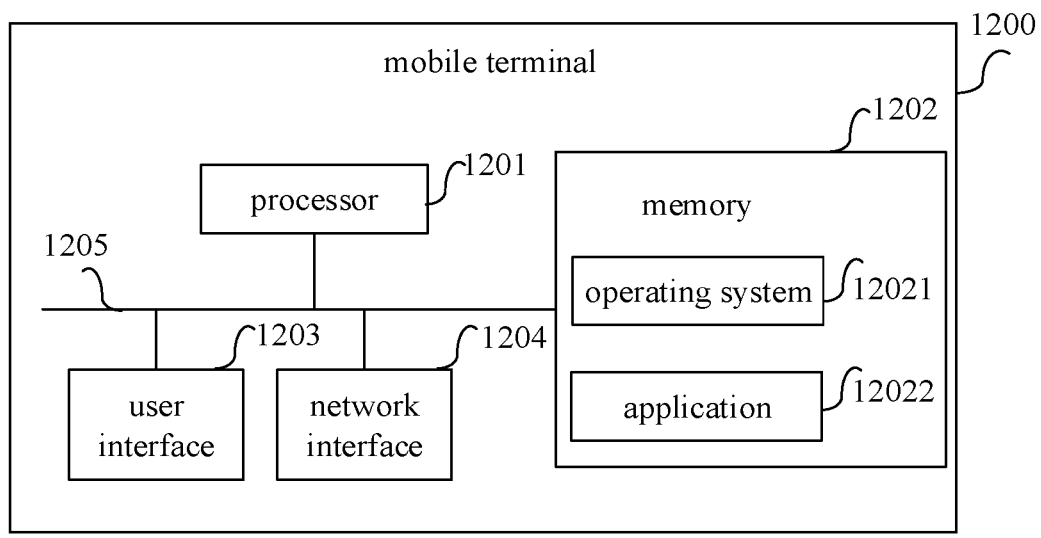
FIG. 12 is a schematic structural diagram of a mobile terminal according to another embodiment of the present disclosure.

FIG. 12 is a block diagram of a mobile terminal according to another embodiment of the present disclosure. The mobile terminal includes a memory, a processor, and a computer program that is stored on the memory and executable on the processor. When executing the computer program, the processor is configured to perform steps in the beam switching method as described above. Specifically, the mobile terminal as shown in FIG. 12 includes: at least one processor 1201, a memory 1202, at least one network interface 1204, and other user interface 1203. Various components in mobile terminal 1200 are coupled together by a bus system 1205. It may be appreciated that the bus system 1205 is configured to implement connections and communications among these components. The bus system 1205 includes a power supply bus, a control bus and a state signal bus, in addition to the data bus. However, for clarity of description, the various buses are denoted by bus system 1205 in FIG. 12.

The user interface 1203 may include a display, a keyboard, or a click device (e.g., a mouse, a trackball, a touchpad, or a touch screen).

It is understandable that the memory 1202 in the embodiments of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EPROM), or an electrically erasable programmable read-only memory (EEPROM) or a flash memory. The volatile memory may be a random access memory (RAM) that acts as a high-speed external cache. By way of example and not limitation, many kinds of RAM are viable, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synch link connection dynamic random access memory (SDRAM) and direct memory bus random access memory (DRRAM). The memory 402 of the systems and methods described in the present specification is intended to include, but not limited to, these and any other suitable types of memory.

In some implementations, the memory 1202 stores following elements, such as executable modules, data structures, or a subset thereof, or an extended set thereof, which may include an operating system 12021 and an application 12022.

The operating system 12021 includes various system programs, such as a framework layer, a core library layer, a driver layer, for implementing various basic services and processing hardware-based tasks. The application 12022 includes various applications programs, such as a media player, and a browser, for implementing various application services. Programs for implementing the methods according to the embodiments of the present disclosure may be included in the application 12022.

In some embodiments of the present disclosure, by calling a program or an instruction stored in the memory 1202, specifically a program or an instruction stored in the application 12022, the processor 1201 is configured to:

monitor whether a first blockage event occurs to an antenna of a terminal; and transmit a beam switching request to a network-side device, in a case that the first blockage event occurs, where the first blockage event includes that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

The methods disclosed in the above embodiments of the present disclosure may be applied to the processor 1201 or implemented by the processor 1201. The processor 1201 may be an integrated circuit chip with signal processing capabilities. In implementations, each step of the foregoing methods may be completed by an integrated logic circuit in form of hardware in the processor 1201 or by an instruction in form of software. The processor 1201 may be a general-purpose processor, a digital signal processor (DSP), an application specific integrated circuit (ASIC), a field programmable gate array (FPGA) or any other programmable logic device, discrete gate, transistor logic device or discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module can be located in a conventional storage medium such as a random access memory, a flash memory, a read-only memory, a programmable read-only memory, an electrically erasable programmable memory, a registers, or the like. The storage medium is located in the memory 1202, and the processor 1201 reads the information from the memory 1202 and completes steps of the above methods in combination with its hardware.

It is understandable that the embodiments described herein can be implemented in hardware, software, firmware, middleware, microcode, or a combination thereof. For hardware implementation, the processing unit can be implemented in one or more of: an application specific integrated circuit (ASIC), a digital signal processor (DSP), a digital signal processing device (DSPD), a programmable logic device (PLD), a field-programmable gate array (FPGA), a general-purpose processor, a controller, a microcontroller, a microprocessor, other electronic units for performing functions according to the present disclosure, or a combination of the above.

For software implementation, the technical solutions in the specification may be implemented by modules (for example, processes, functions, and so on) for performing the functions in the present disclosure. The software code may be stored in the memory and executed by the processor, and the memory may be implemented inside or outside the processor.

Optionally, the processor 1201 is further configured to monitor a quality measurement parameter of each beam link of the first predetermined number of beam links corresponding to the one antenna panel of the terminal; and determine that occurrence of the first blockage event is monitored, in a case that the number of beam links whose quality measurement parameters meet a first preset condition is greater than or equal to the second predetermined number.

Optionally, the quality measurement parameter of each beam link includes at least one of: a received signal strength indicator (RSSI) of the beam link or a reference signal received power (RSRP) of the beam link. In a case that the quality measurement parameter includes the RSSI, the first preset condition includes that the RSSI is smaller than a predetermined RSSI threshold; in a case that the quality measurement parameter includes the RSRP, the first preset condition includes that the RSRP is lower than a predetermined RSRP threshold; or in a case that the quality measurement parameter includes the RSSI and the RSRP, the first preset condition includes that the RSSI is smaller than a predetermined RSSI threshold and the RSRP is lower than a predetermined RSRP threshold.

Optionally, the processor 1201 is further configured to: transmit the beam switching request to the network-side device within a measurement time window of a beam failure event, and reset a measurement occasion of the measurement time window to an initial point of the time window.

Optionally, the processor 1201 is further configured to transmit the beam switching request to the network-side device and set a value of a timer of a beam failure event to zero, within a timing length of the timer.

Optionally, the processor 1201 is further configured to: transmit the beam switching request to the network-side device and set the number of performed measurements of a beam failure event to zero, before a predetermined number of measurements of the beam failure event are completed.

Optionally, the processor 1201 is further configured to transmit the beam switching request to a network-side device on a target resource, where the target resource includes: a reserved resource configured by the network-side device for the terminal, or a resource for transmitting a beam failure recovery request that is configured by the network-side device for the terminal.

The beam switching request includes at least one of: a trigger message for the occurrence of the first blockage event, information about a recommended downlink beam to be switched, information about downlink beams with the quality loss, measurement values of the quality measurement parameters, or indication information indicating a reason for transmitting the beam switching request. The information about the downlink beam to be switched includes an identifier of the downlink beam to be switched; and the information about the downlink beams with the quality loss includes the number of the downlink beams with the quality loss, and an identifier of each downlink beam with the quality loss.

Optionally, the information about the downlink beam to be switched includes at least one of: a received signal strength indicator (RSSI) or a reference signal received power (RSRP) of a beam link corresponding to the downlink beam to be switched.

Optionally, the processor 1201 is further configured to: receive a beam switching response fed back by the network side device according to the beam switching request; perform beam switching based on indication of the beam switching response, where the beam switching response is used to indicate the terminal to directly switch to a target beam, or the beam switching response is used to indicate the terminal to re-perform beam training and indicate parameter information related to the beam training to the terminal.

Optionally, each of the quality measurement parameters is a statistical average of a plurality of quality measurement parameters of a beam link, and the plurality of quality measurement parameters of the beam link is monitored within a time period that is predetermined or a time period that is configured by the network-side device.

The mobile terminal 1200 can implement various processes implemented by the mobile terminal in the foregoing embodiments about the beam switching method, which are not described herein again to avoid repetition. The mobile terminal 1200 performs the above steps, i.e., monitoring whether a first blockage event occurs to an antenna of a terminal (the first blockage event is that a quality loss occurs to beam links corresponding to at least the second predetermined number of downlink beams among the first predetermined number of downlink beams corresponding to a single antenna panel of a terminal), and can timely transmit a beam switching request to the network-side device when the first blockage event occurs. Therefore, a network-side device instructs the terminal to timely switch to a beam link corresponding to an antenna panel where no blockage event occurs, thereby avoiding interruption of transmissions and achieving effective transmissions.

Optionally, in the mobile terminal shown in FIG. 12, the processor 1201 may be configured to implement the following steps:

monitoring received signal strength information of at least one beam link; and determining that a second blockage event occurs to an antenna of a terminal and transmitting a beam switching request to a network-side device, in a case that the number of beam links is greater than or equal to a third predetermined number, and received signal strength information of the beam links meets a second preset condition.

Optionally, the received signal strength information of the at least one beam link includes: a received signal strength indicator (RSSI) of the beam link, and the second preset condition includes that the RSSI is smaller than a predetermined RSSI threshold.

Optionally, the processor 1201 is further configured to: obtain a reference signal received power (RSRP) of a beam link, in a case that a downlink reference signal transmitted by the network-side device is received on the beam link when the received signal strength information of the beam link is monitored. The determining that the second blockage event occurs to the antenna of the terminal and transmitting the beam switching request to the network-side device, in a case that the number of beam links whose received signal strength information meets the second preset condition is greater than or equal to the third predetermined number includes: determining that the second blockage event occurs to the antenna of the terminal and transmitting the beam switching request to the network-side device, in a case that the number of beam links whose received signal strength information meets the second preset condition is greater than or equal to the third predetermined number, and that the number of beam links whose RSRP is lower than a predetermined RSRP threshold is greater than or equal to a fourth predetermined number.

Optionally, the processor 1201 is further configured to: transmit the beam switching request to the network-side device within a measurement time window of a beam failure event, and reset a measurement occasion of the measurement time window to an initial point of the time window.

Optionally, the processor 1201 is further configured to transmit the beam switching request to the network-side device and set a value of a timer of a beam failure event to zero, within a timing length of the timer.

Optionally, the processor 1201 is further configured to: transmit the beam switching request to the network-side device and set the number of performed measurements of a beam failure event to zero, before a predetermined number of measurements of the beam failure event are completed.

Optionally, the processor 1201 is further configured to transmit the beam switching request to a network-side device on a target resource, where the target resource includes: a reserved resource configured by the network-side device for the terminal or a resource for transmitting a beam failure recovery request that is configured by the network-side device for the terminal.

Optionally, the beam switching request includes at least one of: a trigger message for occurrence of the second blockage event, information about a recommended downlink beam to be switched, information about a downlink beam whose received signal strength information meets the second preset condition, a measurement value of the received signal strength information of a beam link, or indication information indicating a reason for transmitting the beam switching request. The information about the downlink beam to be switched includes an identifier of the downlink beam to be switched; and the information about the downlink beam whose received signal strength information meets the second preset condition includes the number of downlink beams whose received signal strength information meets the second preset condition, and an identifier of each downlink beam whose received signal strength information meets the second preset condition.

Optionally, the information about the downlink beam to be switched includes at least one of: a received signal strength indicator (RSSI) or a reference signal received power (RSRP) of a beam link corresponding to the downlink beam to be switched.

Optionally, the processor 1201 is further configured to: receive a beam switching response fed back by the network-side device according to the beam switching request; and perform beam switching based on indication of the beam switching response. The beam switching response is used to indicate the terminal to directly switch to a target beam, or the beam switching response is used to indicate the terminal to re-perform beam training and indicate parameter information related to the beam training to the terminal.

Optionally, the received signal strength information is a statistical average of a plurality of pieces of received signal strength information of a beam link, and the plurality of pieces of received signal strength information of the beam link is monitored within a predetermined time period that is set in advance or a predetermined time period that is configured by the network-side device.

The mobile terminal 1200 performs the above steps, which includes monitoring the received signal strength information of at least one beam link of a terminal, the mobile terminal can no longer rely on a downlink reference signal transmitted by a network-side device, and can timely transmit a beam switching request to the network-side device when the second blockage event occurs, so that the network-side device instructs the terminal to timely switch to another beam link with a good performance, thereby avoiding interruption of transmissions and achieving effective transmissions.

Figure 13:
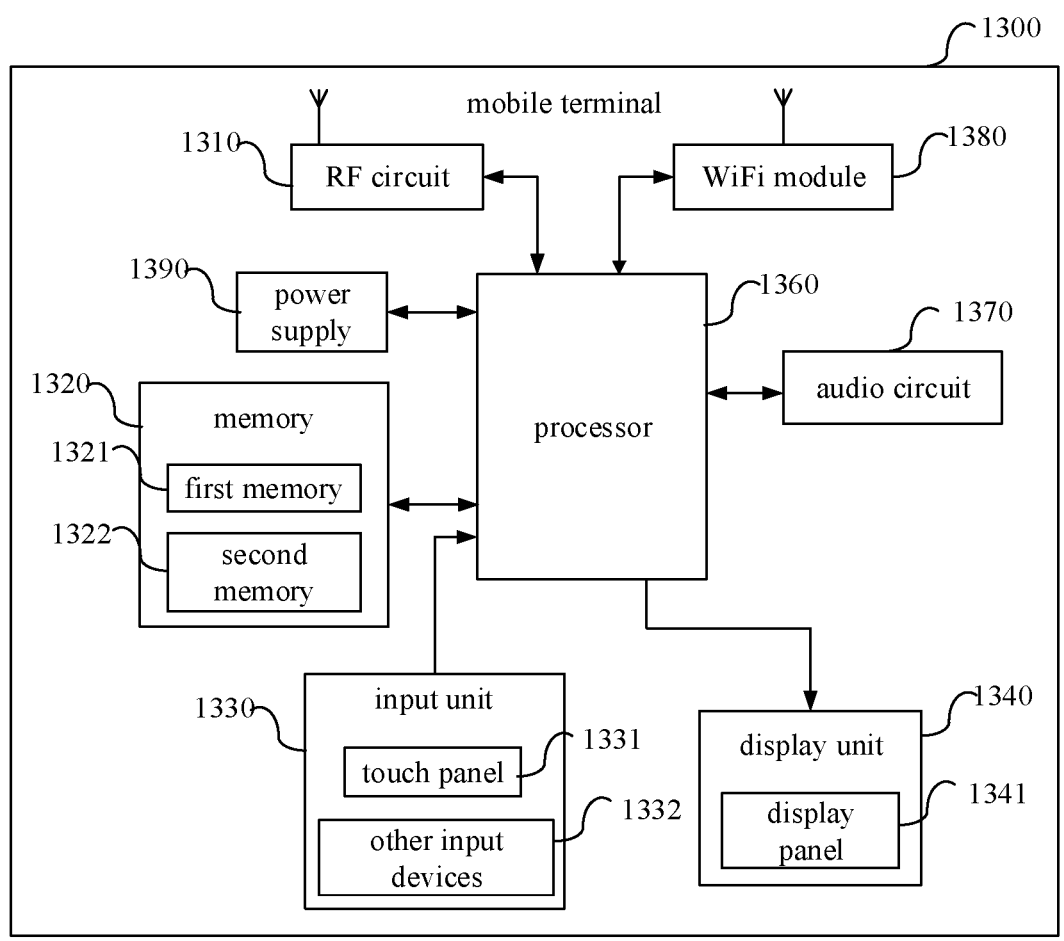
FIG. 13 is a schematic structural diagram of a mobile terminal according to another embodiment of the present disclosure.

FIG. 13 is a schematic structural diagram of a mobile terminal according to another embodiment of the present disclosure. Specifically, the mobile terminal 1300 in FIG. 13 may be a mobile phone, a tablet computer, a personal digital assistant (PDA), or a vehicle-mounted computer, or the like.

The mobile terminal 1300 in FIG. 13 includes a radio frequency (RF) circuit 1310, a memory 1320, an input unit 1330, a display unit 1340, a processor 1360, an audio circuit 1370, a Wireless Fidelity (WiFi) module 1380, and a power supply 1390.

The input unit 1330 may be configured to receive numeric or character information inputted by a user, and to generate signal inputs related to user settings and function control of the mobile terminal 1300. Specifically, in an embodiment of the present disclosure, the input unit 1330 may include a touch panel 1331. The touch panel 1331, also referred to as a touch screen, may collect touch operations by the user on or near the touch panel (such as an operation performed by the user using any suitable object or accessory such as a finger or a stylus on the touch panel 1331), and drive a corresponding connection apparatus according to a predetermined program. Optionally, the touch panel 1331 may include two parts: a touch detection apparatus and a touch controller. The touch detection apparatus is configured to detect a touch position of the user, detect a signal generated due to the touch operation, and transmit the signal to the touch controller; and the touch controller is configured to receive the touch information from the touch detection device, convert the touch information into contact coordinates, send the contact coordinates to the processor 1360, and receive and execute commands from the processor 1360. In addition, the touch panel 1331 may be implemented in various types such as resistive, capacitive, infrared, and surface acoustic waves. In addition to the touch panel 1331, the input unit 1330 may further include other input devices 1332. The input devices 1332 maly include, but not limited to, one or more of a physical keyboard, a function button (such as a volume control button and a switch buttons), a trackball, a mouse, or a joystick.

The display unit 1340 may be configured to display information inputted by the user or information provided to the user and various menu interfaces of the mobile terminal 1300. The display unit 1340 may include a display panel 1341. Optionally, the display panel 1341 may be configured in the form of a liquid crystal display (LCD) panel or an organic light-emitting diode (OLED).

It should be noted that the touch panel 1331 may cover the display panel 1341 to form a touch display screen, and when the touch display screen detects a touch operation on or near it, the touch operation is transmitted to the processor 1360 to determine the type of the touch event, and then the processor 1360 provides a corresponding visual output on the touch display screen based on the type of touch event.

The touch display screen includes an application interface display region and a commonly-used control display area. An arrangement mode of the application interface display region and the common control display region is not limited, which may be up-and-down arrangement or left-and-right arrangement, as long as the two display regions can be distinguished from each other. The application interface display region may be used to display interfaces of applications. Each interface may include interface elements such as at least one application icon and/or widget desktop control. The application interface display region may also be an empty interface that does not contain any content. The commonly-used control display region is configured to display controls which are used frequently, for example, a setting button, an interface number, a scroll bar, and application icons such as a phone book icon.

The processor 1360 is the control center of the mobile terminal 1300, which connects various parts of the entire mobile phone by using various interfaces and wirings, performs functions of the mobile terminal 1300 and process data by running or executing software programs and/or modules stored in a first memory 1321 and invoking data stored in a second memory 1322, thereby performing overall monitoring on the mobile terminal 1300. Optionally, the processor 1360 may include one or more processing units.

In an embodiment of the present disclosure, by calling a software program and/or a module stored in the first memory 1321 and/or data in the second memory 1322, the processor 1360 is configured to: monitor whether a first blockage event occurs to an antenna of a terminal; and transmit a beam switching request to a network-side device, in a case that the first blockage event occurs. The first blockage event includes that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number.

Optionally, the processor 1360 is configured to monitor a quality measurement parameter of each beam link of the first predetermined number of beam links corresponding to the one antenna panel of the terminal; and determine that occurrence of the first blockage event is monitored, in a case that the number of beam links whose quality measurement parameters meet a first preset condition is greater than or equal to the second predetermined number.

Optionally, the quality measurement parameter of each beam link includes at least one of: a received signal strength indicator (RSSI) of the beam link or a reference signal received power (RSRP) of the beam link. In a case that the quality measurement parameter includes the RSSI, the first preset condition includes that the RSSI is smaller than a predetermined RSSI threshold; in a case that the quality measurement parameter includes the RSRP, the first preset condition includes that the RSRP is lower than a predetermined RSRP threshold; or in a case that the quality measurement parameter includes the RSSI and the RSRP, the first preset condition includes that the RSSI is smaller than a predetermined RSSI threshold and the RSRP is lower than a predetermined RSRP threshold.

Optionally, the processor 1360 is further configured to: transmit the beam switching request to the network-side device within a measurement time window of a beam failure event, and reset a measurement occasion of the measurement time window to an initial point of the time window.

Optionally, the processor 1360 is further configured to: transmit the beam switching request to the network-side device and set a value of a timer of a beam failure event to zero, within a timing length of the timer.

Optionally, the processor 1360 is further configured to: transmit the beam switching request to the network-side device and set the number of performed measurements of a beam failure event to zero, before a predetermined number of measurements of the beam failure event are completed.

Optionally, the processor 1360 is further configured to transmit the beam switching request to a network-side device on a target resource, where the target resource includes a reserved resource configured by the network-side device for the terminal or a resource for transmitting a beam failure recovery request that is configured by the network-side device for the terminal.

The beam switching request includes at least one of: a trigger message for the occurrence of the first blockage event, information about a recommended downlink beam to be switched, information about downlink beams with the quality loss, measurement values of the quality measurement parameters, or indication information indicating a reason for transmitting the beam switching request. The information about the downlink beam to be switched includes an identifier of the downlink beam to be switched. The information about the downlink beams with the quality loss includes the number of the downlink beams with the quality loss, and an identifier of each downlink beam with the quality loss.

Optionally, the information about the downlink beam to be switched includes at least one of: a received signal strength indicator (RSSI) or a reference signal received power (RSRP) of a beam link corresponding to the downlink beam to be switched.

Optionally, the processor 1360 is further configured to: receive a beam switching response fed back by the network-side device according to the beam switching request; and perform beam switching according to an indication of the beam switching response, where the beam switching response is used to indicate the terminal to directly switch to a target beam, or the beam switching response is used to indicate the terminal to re-perform beam training and indicate parameter information related to the beam training to the terminal.

Optionally, each of the quality measurement parameters is a statistical average of a plurality of quality measurement parameters of a beam link, and the plurality of quality measurement parameters of the beam link is monitored within a time period that is predetermined or a time period that is configured by the network-side device.

It can be seen that the mobile terminal 1300 performs the above steps. By monitoring whether a first blockage event occurs to an antenna of a terminal (the first blockage event is that a quality loss occurs to beam links corresponding to at least the second predetermined number of downlink beams among the first predetermined number of downlink beams corresponding to a single antenna panel of the terminal), the mobile terminal 1300 can transmit a beam switching request to a network-side device in time when the first blockage event occurs. Therefore, a network-side device instructs the terminal to timely switch to a beam link corresponding to an antenna panel where no blockage event occurs, thereby avoiding interruption of transmissions and achieving effective transmissions.

Optionally, in a mobile terminal as shown in FIG. 13, the processor 1360 is configured to:

monitor received signal strength information of at least one beam link; and determine that a second blockage event of an antenna of the terminal is monitored and transmit a beam switching request to a network-side device, in a case that the number of beam links whose received signal strength information meets a second preset condition is greater than or equal to a third predetermined number.

Optionally, the received signal strength information of the at least one beam link includes: a received signal strength indicator (RSSI) of the beam link, and the second preset condition includes that the RSSI is smaller than a predetermined RSSI threshold.

Optionally, the processor 1360 is further configured to: obtain a reference signal received power (RSRP) of a beam link, in a case that a downlink reference signal transmitted by the network-side device is received on the beam link when the received signal strength information of the beam link is monitored. The determining that the second blockage event occurs to the antenna of the terminal and transmitting the beam switching request to the network-side device, in a case that the number of beam links whose received signal strength information meets the second preset condition is greater than or equal to the third predetermined number includes: determining that the second blockage event occurs to the antenna of the terminal and transmitting the beam switching request to the network-side device, in a case that the number of beam links whose received signal strength information meets the second preset condition is greater than or equal to the third predetermined number, and that the number of beam links whose RSRP is lower than a predetermined RSRP threshold is greater than or equal to a fourth predetermined number.

Optionally, the processor 1360 is further configured to: transmit the beam switching request to the network-side device within a measurement time window of a beam failure event, and reset a measurement occasion of the measurement time window to an initial point of the time window.

Optionally, the processor 1360 is further configured to: transmit the beam switching request to the network-side device and set a value of a timer of a beam failure event to zero, within a timing length of the timer.

Optionally, the processor 1360 is further configured to: transmit the beam switching request to the network-side device and set the number of performed measurements of a beam failure event to zero, before a predetermined number of measurements of the beam failure event are completed.

Optionally, the processor 1360 is further configured to transmit the beam switching request to a network-side device on a target resource, where the target resource includes a reserved resource configured by the network-side device for the terminal or a resource for transmitting a beam failure recovery request that is configured by the network-side device for the terminal.

Optionally, the beam switching request includes at least one of: a trigger message for occurrence of the second blockage event, information about a recommended downlink beam to be switched, information about a downlink beam whose received signal strength information meets the second preset condition, a measurement value of the received signal strength information of a beam link, or indication information indicating a reason for transmitting the beam switching request. The information about the downlink beam to be switched includes an identifier of the downlink beam to be switched. The information about the downlink beam whose received signal strength information meets the second preset condition includes the number of downlink beams whose received signal strength information meets the second preset condition, and an identifier of each downlink beam whose received signal strength information meets the second preset condition.

Optionally, the information about the downlink beam to be switched includes at least one of: a received signal strength indicator (RSSI) or a reference signal received power (RSRP) of a beam link corresponding to the downlink beam to be switched.

Optionally, the processor 1360 is further configured to: receive a beam switching response fed back by the network-side device according to the beam switching request; and perform beam switching based on indication of the beam switching response, where the beam switching response is used to indicate the terminal to directly switch to a target beam, or the beam switching response is used to indicate the terminal to re-perform beam training and indicate parameter information related to the beam training to the terminal.

Optionally, the received signal strength information is a statistical average of a plurality of pieces of received signal strength information of a beam link, and the plurality of pieces of received signal strength information of the beam link is monitored within a predetermined time period that is set in advance or a predetermined time period that is configured by the network-side device.

It can be seen that the mobile terminal 1300 performs the above steps. By monitoring the received signal strength information of at least one beam link of the terminal, the mobile terminal 1300 can no longer rely on a downlink reference signal transmitted by a network-side device, and can timely transmit a beam switching request to the network-side device when a second blockage event occurs, so that the network-side device instructs the terminal to timely switch to another beam link with a good performance, thereby avoiding interruption of transmission and achieving effective transmission.

A person of ordinary skill in the art may well appreciate that units and algorithm steps of various examples described in conjunction with the embodiments according to the present disclosure can be implemented in the form of electronic hardware or a combination of computer software and electronic hardware. Whether these functions are performed in hardware or software depends on specific applications and design constraints of the technical solution. A person of ordinary skill in the art can use different methods to implement the described functions for each particular application, but such implementations should not be considered as going beyond the scope of the present disclosure.

A person of ordinary skill in the art can clearly understand that for convenience and brevity of description, reference can be made to the corresponding processes in the foregoing method embodiments for specific operating processes of the systems, the devices and the units described above, which are not described herein redundantly.

It should be appreciated that in the embodiments according to the present application, the disclosed apparatuses and methods may be implemented in other manners. For example, the apparatus embodiments described above are merely illustrative. For example, the division of the units is only a logical function division, and in practical implementation, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objectives of the technical solutions of the embodiments.

In addition, functional units in various embodiments of the present disclosure may be integrated into one processing unit, or each unit may exist alone physically, or two or more units may be integrated into one unit.

In a case that the functions are implemented in the form of a software functional unit, which is sold or used as a standalone product, the product may be stored in a computer readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that can store program codes, such as a USB flash drive, a mobile hard disk, a ROM, a RAM, a magnetic disk, or an optical disk.

The above-described embodiments are merely some specific embodiments of the present disclosure, but the scope of the present disclosure is not limited to the embodiments. Any modifications, substitutions or improvements within principles of the present disclosure shall fall within the protection scope of the present disclosure.

It should further be noted that the mobile terminals described in this specification include, but not limited to, a smart phone, and a tablet computer.

Many of the functional components described in this specification are referred to as modules, so as to further emphasize the independence of their implementation.

In the embodiments of the present disclosure, the modules may be implemented by software so as to be executed by various types of processors. For example, an identified and executable code module may include one or more physical or logical blocks of computer instructions. For another example, an identified and executable code module may be constructed as an object, a procedure, or a function. Nevertheless, executable codes of the identified modules are not required to be physically located together, but may include different instructions stored in different bits. When these instructions are logically combined, they constitute a module and implement defined functions of the module.

In fact, an executable code module can be a single instruction or many instructions, and can even be distributed in multiple different code segments, among different programs, or across multiple memory devices. Similarly, operational data may be identified within a module, and may be implemented in any suitable form and organized within any suitable type of data structure. The operational data may be collected as a single data set, or may be distributed in different locations (including on different storage devices). At least part of the operational data may exist on a system or a network only as electronic signals.

When the modules may be implemented by software, a person of ordinary skill in the art may build a corresponding hardware circuit to realize the corresponding functions of the modules by taking the current level of hardware technology into account, in case of not considering the cost. The hardware circuit includes conventional very large scale integration (VLSI) circuits or gate arrays, existing semiconductors such as logic chips and transistors, or other discrete components. The modules can also be implemented by programmable hardware devices, such as field programmable gate arrays, programmable array logics, and programmable logic devices.

The above-mentioned exemplary embodiments are described with reference to the drawings. Many different forms and embodiments are feasible without departing from the spirit and teachings of the present disclosure. Therefore, the exemplary embodiments proposed herein should not be constructed as a limitation to the present disclosure. Rather, these exemplary embodiments are provided to make the disclosure thorough and complete, and to convey the scope of the disclosure to those skilled in the art. In these drawings, dimensions of components and relative dimensions thereof may be expanded for clarity. The terminology used herein is for the purpose of only describing particular exemplary embodiments and is not intended to be limiting. As used herein, terms such as "a", "an" and "the" are intended to include those plural forms as well, unless the context clearly indicates otherwise. It will be further understood that terms such as "comprise" and/or "include" used in this specification indicate the existence of stated features, integers, steps, operations, components and/or components, but do not exclude one or more of other features, integers, steps, operations, components, components, and/or their families, which may exist or newly added. Unless stated otherwise, a range of values when stated includes the upper and lower limits of the range and any sub-ranges therebetween.

The above-described embodiments are optional implementations of the present disclosure. It should be noted that those of ordinary skill in the art can further make many improvements and modifications without departing from the principles of the present disclosure, and these improvements and modifications shall also fall within the scope of the present disclosure.

What is claimed is:

1. A beam switching method, comprising:

monitoring whether a first blockage event occurs to an antenna of a terminal; and transmitting a beam switching request to a network-side device, in a case that the first blockage event occurs, wherein the first blockage event comprises that a quality loss occurs to beam links corresponding to at least a second predetermined number of downlink beams, the second predetermined number of downlink beams are from a first predetermined number of downlink beams corresponding to one antenna panel of the terminal, and the first predetermined number is greater than or equal to the second predetermined number;

wherein the monitoring whether the first blockage event occurs to the antenna of the terminal comprises:

monitoring a quality measurement parameter of each beam link of the first predetermined number of beam links corresponding to the one antenna panel of the terminal; and determining that occurrence of the first blockage event is monitored, in a case that the number of beam links whose quality measurement parameters meet a first preset condition is greater than or equal to the second predetermined number;

wherein each of the quality measurement parameters is a statistical average of a plurality of quality measurement parameters of a beam link, and the plurality of quality measurement parameters of the beam link is monitored within a time period that is predetermined or a time period that is configured by the network-side device;

wherein after transmitting the beam switching request to the network-side device, the method further comprise:

receiving a beam switching response fed back by the network-side device according to the beam switching request; and performing beam switching based on indication of the beam switching response, wherein the beam switching response is used to indicate the terminal to directly switch to a target beam, or the beam switching response is used to indicate the terminal to re-perform beam training and indicate parameter information related to the beam training to the terminal.

2. The beam switching method according to claim 1, wherein the quality measurement parameter of each beam link comprises at least one of: a received signal strength indicator (RSSI) of the beam link or a reference signal received power (RSRP) of the beam link;
- in a case that the quality measurement parameter comprises the RSSI, the first preset condition comprises that the RSSI is smaller than a predetermined RSSI threshold;
- in a case that the quality measurement parameter comprises the RSRP, the first preset condition comprises that the RSRP is lower than a predetermined RSRP threshold; or
- in a case that the quality measurement parameter comprises the RSSI and the RSRP, the first preset condition comprises that the RSSI is smaller than a predetermined RSSI threshold and the RSRP is lower than a predetermined RSRP threshold.

3. The beam switching method according to claim 1, wherein the transmitting the beam switching request to the network-side device comprises:
- transmitting the beam switching request to the network-side device on a target resource; and
- wherein the target resource comprises a reserved resource configured by the network-side device for the terminal, or a resource for transmitting a beam failure recovery request that is configured by the network-side device for the terminal.

4. The beam switching method according to claim 1, wherein the beam switching request comprises at least one of: a trigger message for the occurrence of the first blockage event, information about a recommended downlink beam to be switched, information about downlink beams with the quality loss, measurement values of the quality measurement parameters, or indication information indicating a reason for transmitting the beam switching request;
- the information about the downlink beam to be switched comprises an identifier of the downlink beam to be switched; and
- the information about the downlink beams with the quality loss comprises the number of the downlink beams with the quality loss, and an identifier of each downlink beam with the quality loss.

5. The beam switching method according to claim 4, wherein the information about the downlink beam to be switched comprises at least one of: a received signal strength indicator (RSSI) or a reference signal received power (RSRP) of a beam link corresponding to the downlink beam to be switched.

6. The beam switching method according to claim 1, wherein the beam switching method further comprises: after transmitting the beam switching request to the network-side device, receiving a message from the network-side device, wherein the message is used to instruct the terminal to switch to a beam link corresponding to another antenna panel where no blockage event occurs.

7. The beam switching method according to claim 1, wherein the transmitting the beam switching request to the network-side device comprises at least one of the following three manners:
- a first manner, transmitting the beam switching request to the network-side device within a measurement time window of a beam failure event, and resetting a measurement occasion of the measurement time window to an initial point of the time window; or
- a second manner, transmitting the beam switching request to the network-side device and setting a value of a timer of a beam failure event to zero, within a timing length of the timer; or
- a third manner, transmitting the beam switching request to the network-side device and setting the number of performed measurements of a beam failure event to zero, before a predetermined number of measurements of the beam failure event are completed.

8. A mobile terminal, comprising a memory, a processor, and a program that is stored on the memory and executable on the processor, wherein when executing the program, the processor is configured to perform steps in the beam switching method according to claim 1, wherein the mobile terminal is the terminal to which the antenna belongs.

9. The mobile terminal according to claim 8, wherein the quality measurement parameter of each beam link comprises at least one of: a received signal strength indicator (RSSI) of the beam link or a reference signal received power (RSRP) of the beam link;
- in a case that the quality measurement parameter comprises the RSSI, the first preset condition comprises that the RSSI is smaller than a predetermined RSSI threshold;
- in a case that the quality measurement parameter comprises the RSRP, the first preset condition comprises that the RSRP is lower than a predetermined RSRP threshold; or in a case that the quality measurement parameter comprises the RSSI and the RSRP, the first preset condition comprises that the RSSI is smaller than a predetermined RSSI threshold and the RSRP is lower than a predetermined RSRP threshold.

10. A beam switching method, comprising:
- monitoring received signal strength information of at least one beam link; and
- determining that a second blockage event occurs to an antenna of a terminal and transmitting a beam switching request to a network-side device, in a case that the number of beam links whose received signal strength information meets a second preset condition is greater than or equal to a third predetermined number,
- wherein the received signal strength information is a statistical average of a plurality of pieces of received signal strength information of a beam link, and the plurality of pieces of received signal strength information of the beam link is monitored within a time period that is predetermined or a time period that is configured by the network-side device;
- wherein after transmitting the beam switching request to the network-side device, the method further comprises:
- receiving a beam switching response fed back by the network-side device according to the beam switching request; and
- performing beam switching based on indication of the beam switching response,
- wherein the beam switching response is used to indicate the terminal to directly switch to a target beam, or the beam switching response is used to indicate the terminal to re-perform beam training and indicate parameter information related to the beam training to the terminal.

11. The beam switching method according to claim 10, wherein the received signal strength information of the at least one beam link comprises: a received signal strength indicator (RSSI) of the at least one beam link, and
- the second preset condition comprises that the RSSI is smaller than a predetermined RSSI threshold.

12. The beam switching method according to claim 10, further comprising:
obtaining a reference signal received power (RSRP) of a beam link, in a case that a downlink reference signal transmitted by the network-side device is received on the beam link when the received signal strength information of the beam link is monitored,
wherein the determining that the second blockage event occurs to the antenna of the terminal and transmitting the beam switching request to the network-side device, in a case that the number of beam links whose received signal strength information meets the second preset condition is greater than or equal to the third predetermined number comprises:
determining that the second blockage event occurs to the antenna of the terminal and transmitting the beam switching request to the network-side device, in a case that the number of beam links whose received signal strength information meets the second preset condition is greater than or equal to the third predetermined number, and that the number of beam links whose RSRP is lower than a predetermined RSRP threshold is greater than or equal to a fourth predetermined number.

13. The beam switching method according to claim 10, wherein the transmitting the beam switching request to the network-side device comprises:
transmitting the beam switching request to the network-side device on a target resource; and
wherein the target resource comprises a reserved resource configured by the network-side device for the terminal, or a resource for transmitting a beam failure recovery request that is configured by the network-side device for the terminal.

14. The beam switching method according to claim 10, wherein the beam switching request comprises at least one of: a trigger message for occurrence of the second blockage event, information about a recommended downlink beam to be switched, information about a downlink beam whose received signal strength information meets the second preset condition, a measurement value of the received signal strength information of a beam link, or indication information indicating a reason for transmitting the beam switching request;
the information about the downlink beam to be switched comprises an identifier of the downlink beam to be switched; and
the information about the downlink beam whose received signal strength information meets the second preset condition comprises the number of downlink beams whose received signal strength information meets the second preset condition, and an identifier of each downlink beam whose received signal strength information meets the second preset condition.

15. The beam switching method according to claim 14, wherein the information about the downlink beam to be switched comprises at least one of: a received signal strength indicator (RSSI) or a reference signal received power (RSRP) of a beam link corresponding to the downlink beam to be switched.

16. The beam switching method according to claim 10, wherein the transmitting the beam switching request to the network-side device comprises at least one of the following three manners:
a first manner, transmitting the beam switching request to the network-side device within a measurement time window of a beam failure event, and resetting a measurement occasion of the measurement time window to an initial point of the time window; or
a second manner, transmitting the beam switching request to the network-side device and setting a value of a timer of a beam failure event to zero, within a timing length of the timer; or
a third manner, transmitting the beam switching request to the network-side device and setting the number of performed measurements of a beam failure event to zero, before a predetermined number of measurements of the beam failure event are completed.

17. The beam switching method according to claim 10, wherein the beam switching method further comprises: after transmitting the beam switching request to the network-side device, receiving a message from the network-side device, wherein the message is used to instruct the terminal to switch to a beam link corresponding to an antenna panel where no blockage event occurs.

18. A mobile terminal, comprising a memory, a processor, and a program that is stored on the memory and executable on the processor, wherein when executing the program, the processor is configured to perform steps in the beam switching method according to claim 10, wherein the mobile terminal is the terminal to which the antenna belongs.

* * * * *